United States Patent [19]

Yamaya et al.

[11] Patent Number: 5,650,474
[45] Date of Patent: Jul. 22, 1997

[54] PROCESS FOR PREPARING ORGANIC FUNCTIONAL GROUP-CONTAINING ORGANOPOLYSILOXANES, ORGANOPOLYSILOXANES OBTAINED BY THE PROCESS AND NOVEL MERCAPTO GROUP AND ALKOXY GROUP-CONTAINING ORGANOPOLYSILOXANES AND PREPARATION THEREOF

[75] Inventors: Masaaki Yamaya; Kazuyuki Matsumura, both of Takasaki; Yuji Yoshikawa, Annaka, all of Japan

[73] Assignee: Shin-Etsu Chemical Co., Ltd., Tokyo, Japan

[21] Appl. No.: 602,889

[22] Filed: Feb. 16, 1996

Related U.S. Application Data

[63] Continuation of Ser. No. 334,483, Nov. 4, 1994, abandoned.

[30] Foreign Application Priority Data

| Nov. 5, 1993 | [JP] | Japan | 5-276364 |
| Nov. 8, 1993 | [JP] | Japan | 5-302408 |
| Mar. 3, 1994 | [JP] | Japan | 6-060106 |

[51] Int. Cl.$^6$ ................................... C08G 77/08
[52] U.S. Cl. .................. 528/12; 528/40; 528/14; 528/39; 528/32; 528/38; 528/30; 528/26; 549/215
[58] Field of Search ................. 528/12, 40, 14, 528/39, 32, 38, 30, 26; 549/215

[56] References Cited

U.S. PATENT DOCUMENTS

| 3,619,281 | 11/1971 | Kroning | 528/12 |
| 3,887,487 | 6/1975 | Camp et al. | 549/215 |
| 4,020,043 | 4/1977 | Siefken | 260/46.5 |
| 4,069,368 | 1/1978 | Deyak et al. | 428/447 |
| 4,167,617 | 9/1979 | Siefken | 549/215 |
| 4,388,449 | 6/1983 | Bonnet et al. | 525/477 |
| 4,611,040 | 9/1986 | Olson et al. | 526/279 |
| 4,680,365 | 7/1987 | Müller et al. | 528/15 |
| 4,722,987 | 2/1988 | Ikeno et al. | 528/23 |
| 4,888,405 | 12/1989 | Gamon et al. | 528/23 |
| 5,039,771 | 8/1991 | Morimoto et al. | 528/14 |
| 5,086,145 | 2/1992 | Morimoto et al. | 528/14 |
| 5,223,595 | 6/1993 | Stepp et al. | 528/14 |
| 5,280,098 | 1/1994 | Witucki et al. | 528/17 |
| 5,290,900 | 3/1994 | Kobayashi | 528/26 |
| 5,292,787 | 3/1994 | Griswold et al. | 524/265 |
| 5,292,827 | 3/1994 | Raleigh et al. | 525/390 |
| 5,310,843 | 5/1994 | Morita | 528/15 |

FOREIGN PATENT DOCUMENTS

| 0231093 | 8/1987 | European Pat. Off. . |
| 0508490 | 10/1992 | European Pat. Off. . |
| 0576166 | 12/1993 | European Pat. Off. . |
| 0672702 | 9/1995 | European Pat. Off. . |
| 55-165922 | 12/1980 | Japan . |
| 58-113131 | 7/1983 | Japan . |
| 60-118715 | 6/1985 | Japan . |
| 62-166887 | 7/1987 | Japan . |
| 4114065 | 4/1992 | Japan . |

OTHER PUBLICATIONS

The Journal of The Chemical Society of Japan 1983(11), pp. 1577 to 1581.
Fifth Series of Jikken Kagaku Koza, p. 518.
Jikken Kagaku Koza Fifth Series, p. 132.
Jikken Kagaku Koza, fifth series, pp. 1044, 1170.
Noll, *Chemistry and Technology of Silicones* 1968 p. 212.
Database WPI, Derwent Publications Ltd., London, GB; AN 84–221813 & JP–A–59 129 230 (Dainippon Ink Chem KK.), 25 Jul. 1984.
Database WPI, Derwent Publications Ltd., London, GB; AN 84–191772 & JP–A–59 108 033 (Dainippon Ink Chem KK.), 22 Jun. 1984.

*Primary Examiner*—Margaret W. Glass
*Attorney, Agent, or Firm*—Lowe, Price, LeBlanc & Becker

[57] ABSTRACT

A process for preparing an organic functional group-containing organopolysiloxane of the following average compositional formula (1)

$$Y_m R^1{}_n Si(OR^2)_p O_{(4-m-n-p)/2} \qquad (1)$$

wherein Y represents an organic group having a functional group, $R^1$ represents at least one monovalent substituted or unsubstituted hydrocarbon group, $R^2$ represents a hydrogen atom, an alkenyl group and/or an alkenyl group, $0<m\leq 1$, $0\leq n<2$, and $0\leq p\leq 2$ provided that $0<m+n+p\leq 3$. The organopolysiloxane is obtained by subjecting an organic functional group-containing alkoxysilane, with or without a functional group-free alkoxysilane, siloxane and/or silicone obtained from the group-free alkoxysiloxane and/or siloxane, to hydrolysis and polycondensation in the presence of a substantially neutral fluorine-containing compound. The functional group includes an epoxy group, a (meth)acryloxy group, a mercapto group and the like. Organopolysiloxanes having both a mercapto group and alkoxy group are novel ones.

12 Claims, 15 Drawing Sheets

PROCESS FOR PREPARING ORGANIC FUNCTIONAL GROUP-CONTAINING ORGANOPOLYSILOXANES, ORGANOPOLYSILOXANES OBTAINED BY THE PROCESS AND NOVEL MERCAPTO GROUP AND ALKOXY GROUP-CONTAINING ORGANOPOLYSILOXANES AND PREPARATION THEREOF

This application is a continuation of Application Ser. No. 08/334,483 filed Nov. 4, 1994, now abandoned.

BACKGROUND OF THE INVENTION

1. Field of the Invention

This invention relates to a process for preparing organic functional group-containing organopolysiloxanes and also to organopolysiloxanes obtained by the process. The invention also relates to a process for preparing organopolysiloxanes having a polymer moiety having specific types of recurring units. The invention relates to a novel organopolysiloxane oligomer or polymer having both a mercapto functional group and an alkoxy group and a process for preparing such a novel oligomer or polymer.

2. Description of the Related Art

A number of organic functional group-containing organopolysiloxane powder materials have been already proposed including a process wherein tetraalkoxysilanes and organoalkoxysilanes are subjected to co-hydrolysis and polycondensation reaction in the presence of ammonia serving as a catalyst as proposed in Japanese Laid-open Patent Application No. 4-114065 and a process wherein the above co-hydrolysis and polycondensation reaction is conducted in the presence of a hydrofluoric acid (Japanese Laid-open Patent Application No. 62-166887 and Journal of the Japanese Chemical Society 1983 (11), pp. 1577 to 1588).

On the other hand, for the preparation of polysilsesquioxane, there are known a number of processes for hydrolyzing and polycondensing alkoxysilanes such as methyltrimethoxysilane. In most cases, acids, bases or silanol group-containing compounds are used as a catalyst for the hydrolysis and polycondensation. For instance, Japanese Laid-open Patent Application No. 60-118715 proposes a process wherein hydrolysis is effected using an acid catalyst and the resultant reaction system is rendered basic, followed by subsequent polycondensation. In Japanese Laid-open Patent Application 61-854, a partially hydrolyzed polycondensate of a trialkoxysilane is provided as a catalyst for hydrolysis and polycondensation reaction.

As is known in the art, however, the above-stated processes for preparing organic functional group-containing organopolysiloxane powders have problems on (1) uniform dispersion or distribution of the organic functional group in the fine pores of the organopolysiloxane product, (2) a highly reactive organic functional group being kept as it is during and after the course of the hydrolysis and condensation, (3) porosity, and (4) working properties.

With respect to the uniform dispersion or distribution (1), it is not possible to uniformly disperse or distribute the organic functional group throughout the inside of the fine pore according to a dry process wherein a silane coupling agent is sprayed over silicon dioxide powder. For the uniform dispersion and distribution, it has been accepted as being better to make use of a wet process using a co-hydrolysis reaction. With respect to (2) above, where organopolysiloxane powder materials having a highly active organic functional group such as, for example, an epoxy group are prepared by use of an acid or alkali catalyst, the organic functional group is attacked with the acid or alkali catalyst and its functionality is lost. As for the porosity of (3), when using a process which requires a long time before gelation, organopolysiloxane powder particles are gradually deposited one on another, so that porous powder particles are unlikely to obtain. In this connection, it is known that when HF is used, gelation can be completed within a very short time. This eventually leads to the formation of a very porous organopolysiloxane powder substance. However, the use of HF has the problem that the working environment has to be severely controlled owing to the danger involved in HF.

On the other hand, when an alkoxysilane having a highly reactive functional group such as an epoxy group is hydrolyzed and condensed or polycondensed to obtain an epoxy group-containing polysilsesquioxane, the known processes set out hereinbefore have the following drawbacks.

In reaction systems where an acid or base catalyst is used in large amounts, the epoxy group undergoes the electrophilic action owing to $H^+$ or the nucleophilic attack of the base, and is readily ring-opened or polymerized, thus not permitting the epoxy group to be left stably.

On the other hand, in reaction systems containing an acid or base catalyst having a diluted concentration, the hydrolysis and condensation reaction is unlikely to proceed smoothly. The silanol groups formed by the hydrolysis reaction become stabilized, with the possibility that during a long-term reaction, the acidic silanol group inconveniently serves to open the ring of the epoxy group.

When using an acid or base catalyst, silanol groups which are condensable are left in large amounts after completion of the reaction. This may cause the reaction system to be changed as time passes, resulting, for example, in thickening or gelation of the system.

Most acidic or basic substances are corrosive in nature. Technical consideration should have been taken into account to prevent reactors materials from being corroded. These acids and bases are not beneficial in view of the safety of the working environment.

Thus, in prior art processes, it has been difficult to obtain organic functional group-containing polysilsesquioxane of high quality wherein the functional group is present in the sesquioxane stably without involving any significant change in quality in relation to the time and wherein little problem is involved in operation and safety.

In addition, if it is intended to leave part of an alkoxy group of organic functional group-containing alkoxysilane starting materials after completion of hydrolysis and condensation in reaction systems using an acid or base catalyst, it is essential to carry out partial hydrolysis while controlling an amount of water to be added. The condensation reaction speed in such reaction systems as set out above is not high even when water is employed in large excess. For the partial hydrolysis, a degree of condensation becomes lower. Thus, it will become difficult to prepare a partially hydrolyzed organopolysiloxane product with a desired degree of oligomerization or polymerization.

SUMMARY OF THE INVENTION

It is therefore an object of the present invention to provide a process for preparing organic functional group-containing organopolysiloxanes which overcomes the problems and drawbacks involved in the prior art processes or techniques using acid or base catalysts and which is simple in procedure.

It is another object of the invention to provide a process for preparing organic functional group-containing organopolysiloxanes in substantially neutral reaction systems wherein the hydrolysis and (poly)condensation reaction proceeds stably without any danger based on the use of acids or bases in prior art processes.

It is a further object of the invention to provide a process for preparing organic functional group-containing organopolysiloxanes which cover a wide variety of functional groups and which are obtained in the form of resin powder, polymers and oligomers by proper control of the amount of water to be added for the hydrolysis and (poly) condensation reaction.

It is a still further object of the invention to provide a process for preparing organopolysiloxanes having a highly reactive organic functional group therein whereby such polysiloxanes have wide utility in the field of crosslinking agents, reactive coupling agents, reactive diluents and the like.

It is another object of the invention to provide a process for preparing organopolysiloxanes having a polymer moiety therein whereby good compatibility with various types of synthetic and natural resins or polymers is ensured.

It is another object of the invention to provide novel organopolysiloxane oligomers and polymers having both a mercapto group and at least one alkoxy group and a process for preparing the novel mercapto group and a hydrolyzable group-containing organopolysiloxane oligomers or polymers.

According to one embodiment of the invention, there is provided a process for preparing an organic functional group-containing organopolysiloxane of the following average compositional formula (1)

$$Y_m R^1{}_n Si(OR^2)_p O_{(4-m-n-p)/2} \quad (1)$$

wherein Y represents an organic group having a member selected from the group consisting of a substituted or unsubstituted alkenyl group, epoxy group, (meth)acryloxy group, amino group, hydroxyl group, siloxy group, ether group, ketone group, ester group and phosphorus, $R^1$ represents at least one monovalent substituted or unsubstituted hydrocarbon group having from 1 to 8 carbon atoms, $R^2$ represents at least one member selected from the group consisting of a hydrogen atom, an alkyl group having from 1 to 4 carbon atoms and an alkenyl group having from 2 to 5 carbon atoms, $0<m\leq 1$, $0\leq n<2$, and $0\leq p\leq 2$ provided that $0<m+n+p\leq 3$, the process comprising providing an organic functional group-containing alkoxysilane of the following general formula (2)

$$Y-SiR^1{}_a(OR^2)_{3-a} \quad (2)$$

wherein $R^1$ and $R^2$ have, respectively, the same meaning as defined above, and a is an integer within $0\leq a\leq 2$, and subjecting the organic functional alkoxysilane to hydrolysis and polycondensation in the presence of a substantially neutral fluorine-containing compound.

It will be noted that the term "substantially neutral" used herein is intended to mean that the fluorine-containing compound is not exactly neutral in pH but when dissolved in water, the compound is able to release a counter ion other than $H^+$ relative to $F^-$, is a neutralized one of HF and may exhibit weak acidity or weak alkalinity.

Moreover, the organic functional group-containing alkoxysilane may be used in combination with at least one compound selected from alkoxysilane compounds of the following general formula (3), siloxane compounds of the following general formula (4) and partially and fully hydrolyzed condensates of the alkoxysilane compounds of the formula (3) and/or the siloxane compounds of the formula (4)

$$(R^1)_b Si(OR^2)_{4-b} \quad (3)$$

$$R^1{}_c SiO_{(4-c-d)/2}(OR^2)_d \quad (4)$$

wherein $R^1$ and $R^2$ have, respectively, the same meanings as defined above, b is zero or an integer of 1,2 or 3, c is a value within a range of $0\leq c\leq 2$, and d is a value within a range of $0\leq d\leq 3$ provided that $0.01\leq c+d\leq 3$.

According to another embodiment of the invention, there is also provided a process for preparing a polymer moiety-containing organopolysiloxane of the following average compositional formula (1')

$$Y^1{}_m R^1{}_n Si(OR^2)_p O_{(4-m-n-p)/2} \quad (1')$$

wherein $Y^1$ represents an organic group having a polymer moiety which comprises aromatic vinyl recurring units, ether recurring units or amide recurring units as the polymer moiety, $R^1$, $R^2$, m, n, p have, respectively, the same meanings as defined with respect to the formula (1), the process comprising subjecting a polymer moiety-containing alkoxysilane of the following general formula (2')

$$Y^1-SiR^1{}_a(OR^2)_{3-a} \quad (2')$$

wherein $Y^1$, $R^1$ and $R^2$ have, respectively, the same meanings as defined above, a is $0\leq a\leq 2$ as defined with respect to the formula (2), and subjecting the organic functional group-containing alkoxysilane to hydrolysis and polycondensation reaction in the presence of a substantially neutral fluorine-containing compound.

In this case, the polymer moiety-containing alkoxysilane of the formula (2') may also be used in combination with the alkoxysilane of the formula (3), the siloxane compound of the general formula (4) and partially and fully hydrolyzed condensates of the compounds of the formulas (3) and/or (4). This polymer moiety-containing organopolysiloxane exhibits good compatibility with ordinary synthetic or natural resins or polymers.

According to a further embodiment of the invention, there is also provided a process for preparing a mercapto group-containing organopolysiloxane of the following average compositional formula (1")

$$Y^2 R^1{}_n Si(OR^2)_p O_{(4-m-n-p)/2} \quad (1")$$

wherein $Y^2$ represents an organic group having a mercapto group, $R^1$ represents at least one substituted or unsubstituted monovalent hydrocarbon group having from 1 to 8 carbon atoms, $R^2$ represents at least one member selected from a hydrogen atom and alkyl, an alkyl group having from 1 to 4 carbon atoms and an alkenyl group having from 2 to 5 carbon atoms, $0<m\leq 1$, $0\leq n<2$, and $0\leq p\leq 2$ provided that $0<m+n+p\leq 3.0$, the process comprising subjecting a mercapto functional group-containing alkoxysilane of the following general formula (2")

$$Y^2-SiR^1{}_a(OR^2)_{3-a} \quad (2")$$

wherein $Y^2$, $R^1$ and $R^2$ have, respectively, the same meanings as defined with respect to the formula (1"), a is an integer of 0, 1 or 2 as defined with respect to the formula (2), to hydrolysis and polycondensation in the presence of a substantially neutral fluorine-containing compound. In this case, it is preferred that a small amount of an acid or base co-exists with the fluorine-containing compound, unlike the foregoing embodiments in order to facilitate the hydrolysis reaction more efficiently but the acid or base is used in an amount sufficient not to damage the mercapto group.

The organopolysiloxanes of the formula (1") wherein $0<m\leq 1$, $0\leq n\leq 2$, $1\leq p\leq 2$ provided that $0.1<m+n+p\leq 3.0$ and thus, the organopolysiloxanes have both a mercapto group and an alkoxy group in the molecule, are not known in the art.

Such an organopolysiloxane having both a mercapto group and an alkoxy group can be prepared by subjecting a mercapto functional group-containing alkoxysilane of the general formula (2") to hydrolysis and polycondensation in the presence of a substantially neutral fluorine-containing compound in such a way that water is added to the alkoxysilane in an amount less than ½ times the total moles of the alkoxy groups present in the alkoxysilane.

Of course, the mercapto functional group-containing alkoxysilane of the formula (2") may be used in combination with the alkoxysilane of the formula (3), the siloxane of the general formula (4) and partially and fully hydrolyzed condensates of the compounds of the formulas (3) and/or (4) while controlling the amount of water to be added as defined above. In this process, it is also preferred that an acid or base is added along with the substantially neutral fluorine-containing compound to facilitate the hydrolysis and polycondensation reaction using at least the mercapto group-containing alkoxysilane.

DETAILED DESCRIPTION AND EMBODIMENT OF THE INVENTION

Figure 1:
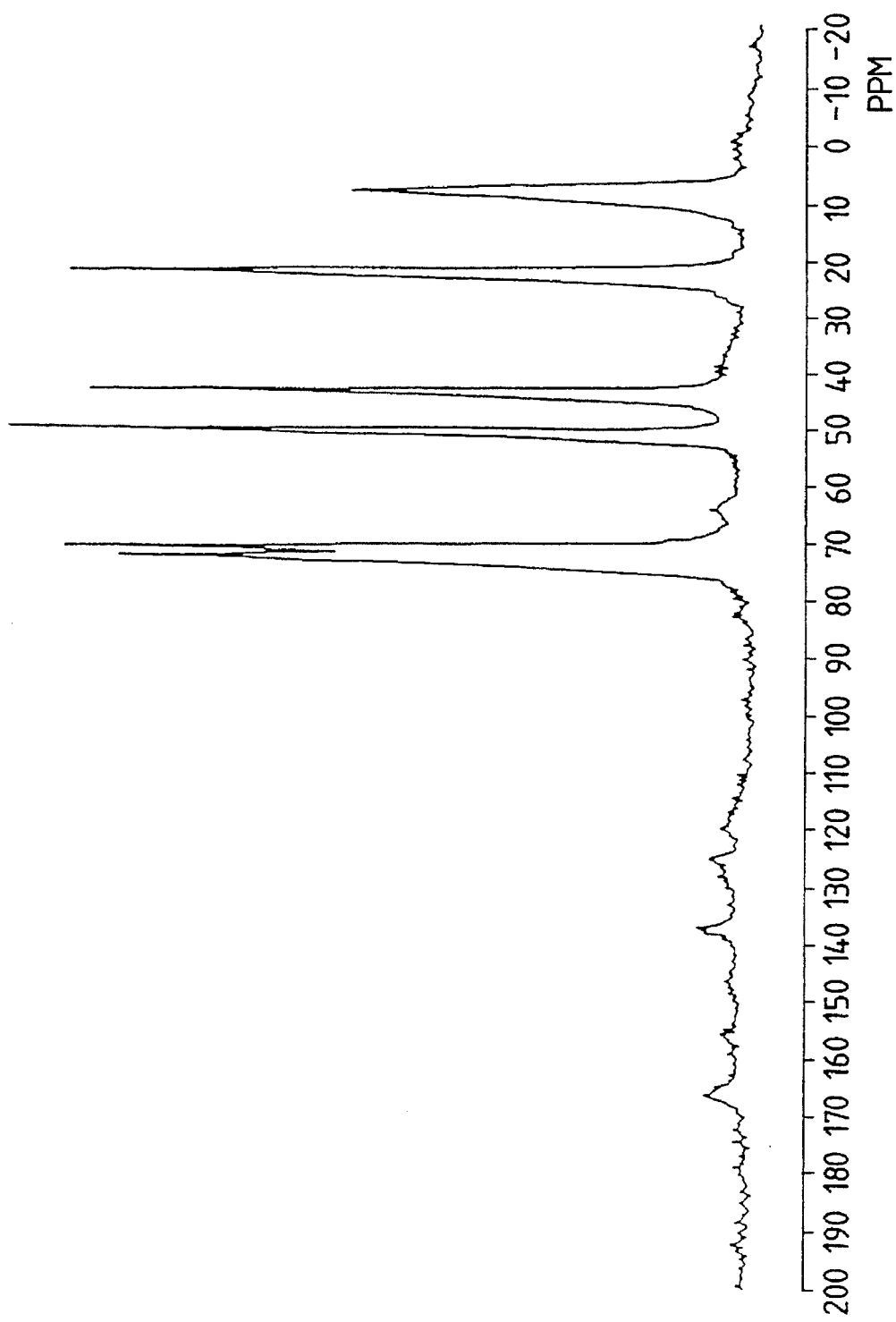
FIG. 1 is a CPMAS (cross polarization magic angle spinning)-$^{13}$C-NMR spectrum chart of γ-glycidoxypropyl group-containing organopolysiloxane particles obtained in Example 1.

Broadly, the present invention is characterized by using substantially neutral fluorine-containing compounds as a catalyst for hydrolysis and polycondensation of organic functional group or polymer moiety-containing alkoxysilanes (hereinafter referred to simply as organic functional group-containing alkoxysilanes) with or without use of other alkoxysilanes, siloxanes or silicone compounds. The substantially neutral fluorine-containing compounds are first described.

The fluorine-containing compounds used in the practice of the invention broadly include fluoride salts and fluorine-containing silicon compounds having at least one Si—F bond in the molecule. The fluorine-containing compounds should be substantially neutral in the sense defined hereinbefore. Accordingly, the fluorine-containing compounds used in the present invention should not be in the form of an acid or a base.

Examples of the fluorides include fluorine-containing inorganic salts. The fluorine-containing inorganic salts include, for example, fluorides with the elements of Group IA of the periodic table such as LiF, NaF, KF, CsF and the like, fluorides with the elements of Group IIA of the periodic table such as $BeF_2$, $MgF_2$, $CaF_2$, $SrF_2$, $BaF_2$ and the like, fluorides with the elements of Group IIIB such as $BF_3$, $AlF_3$, $GaF_3$, $InF_3$ and the like, fluorides with metals such as $TiF_4$, $CuF_2$, $ZnF_4$, $SnF_4$, $PdF_3$, $SbF_3$, $CrF_3$, $YF_3$ and the like, and fluorides of lanthanides such as $LaF_3$, $CeF_3$, $PrF_3$, $NdF_3$, $SmF_3$, $EuF_3$, $GdF_3$, $TbF_3$, $DyF_3$, $HoF_3$, $ErF_3$ and the like. These may be in the form of hydrates. Of course, the fluorides may be supported on silica gel, alumina or the like carriers.

Moreover, quaternary ammonium fluorides may also be used as the fluoride. Specific examples include those compounds of the following formulas $[(CH_3)_4N^+]F^-$, $[(CH_3CH_2)_4N^+]F^-$, $[(CH_3CH_2CH_2)_4N^+]F^-$, $[(CH_3CH_2CH_2CH_2)_4N^+]F^-$ and

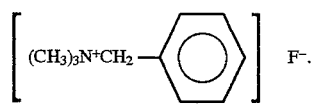

Examples of the fluorine-containing silicon compounds having at least one Si—F bond in the molecule include organic and inorganic compounds. Specific examples of the organic fluorine-containing compounds include $FSi(OCH_3)_3$, $FSi(OCH_2CH_3)_3$, $FSi(OCH_2CH_2CH_3)_3$, $FSi(OCH_2CH_2CH_2CH_3)_3$, $F_2Si(OCH_3)_2$, $F_2Si(OCH_2CH_3)_2$, $F_2Si(OCH_2CH_2CH_3)_2$, $F_2Si(OCH_2CH_2CH_2CH_3)_2$, $F_3SiOCH_3$, $F_3SiOCH_2CH_3$, $F_3SiOCH_2CH_2CH_3$, $F_3SiOCH_2CH_2CH_2CH_3$, and the like. If at least one Si—F bond is present, polysiloxane and polysilane compounds may also be used in the practice of the invention. In addition, specific examples of the inorganic compound include $SiF_4$, $Na_2SiF_6$, $(NH_4)_2SiF_6$ and the like.

These fluorides and fluorine-containing silicon compounds may be used singly or in combination.

Of these, in view of the cost, solubility in solvent, handling and safety, it is preferred to use NaF, KF, $[(C_4H_9)_4N]^+F^-$ and $Na_2SiF_6$. More preferably, NaF, KF and $[(C_4H_9)_4N]^+F^-$ are used. Most preferably, KF or $[(C_4H_9)_4N]^+F^-$ is used.

The fluorine-containing compound may be directly added to at least one starting material for hydrolysis or after dilution with water or organic solvents. The fluorine-containing compound should preferably be present in a reaction system in such an amount that a molar ratio between the Si atoms present in all starting alkoxy group-containing materials and the F atoms in the fluorine-containing compound used ranges from 1:0.00001 to 1:2, more preferably 1:0.01 to 1:0.1. If the molar ratio of F used is lower than 1:0.00001, the fluorine-containing compound does not serve as a catalyst for the hydrolysis satisfactorily, undesirably taking a very long time for the reaction. In addition, the resultant organopolysiloxane is unlikely to exhibit good properties in most cases. On the other hand, when the molar ratio of F exceeds 2, the pot yield lowers, thus with the great possibility of high production costs.

In the first embodiment of the invention, there is provided a process for preparing an organic functional group-containing organopolysiloxane of the following average compositional formula (1)

  (1)

wherein Y represents an organic group having a member selected from the group consisting of substituted or unsubstituted alkenyl group, epoxy group, (meth)acryloxy group, amino group, hydroxyl group, siloxy group, ether group, ketone group, ester group and phosphorus, $R^1$ represents at least one monovalent substituted or unsubstituted hydrocarbon group having from 1 to 8 carbon atoms, $R^2$ represents at least one member selected from the group consisting of a hydrogen atom, an alkyl group having from 1 to 4 carbon atoms and an alkenyl group having from 2 to 5 carbon atoms, $0<m\leq 1$, $0\leq n<2$, and $0\leq p\leq 2$ provided that $0<m+n+p\leq 3$, the process comprising providing an organic functional group-containing alkoxysilane of the following general formula (2)

  (2)

wherein $R^1$ and $R^2$ have, respectively, the same meanings as defined above, and a is an integer within $0\leq a\leq 2$, and subjecting the organic functional group-containing alkoxysilane to hydrolysis and polycondensation in the presence of a substantially neutral fluorine-containing compound.

The functional group-containing alkoxysilane of the general formula (2) which is an essential starting material in this embodiment of the invention is described in detail.

The organic group represented by Y in the formulas (1) and (2) should contain a substituted or unsubstituted alkenyl group, epoxy group, (meth)acryloxy group, an amino group, hydroxyl group, siloxy group, ether group, ketone group and ester group, or phosphorus.

The organic group containing a substituted or unsubstituted alkenyl group includes an ethylene group and those groups represented by the general formula, $CH_2=CHR^4$— wherein $R^4$ represents a divalent hydrocarbon group with 1 to 10 carbon atoms. Examples of the organic group include —CH=CH$_2$, —CH$_2$CH=CH$_2$, CH$_2$=CH(CH$_2$)$_4$—, CH$_2$=CH(CH$_2$)$_8$— and the like, and those groups mentioned above but substituted with a halogen such as fluorine, chlorine or the like.

The epoxy group-containing organic group represented by $Y^2$ includes those groups of the following general formulas

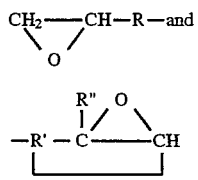

wherein R represents a divalent hydrocarbon group having from 1 to 8 carbon atoms with or without an oxygen atom in the hydrocarbon group, R' represents a trivalent hydrocarbon group having from 6 to 10 carbon atoms, and R" represents a hydrogen atom, an alkyl group having from 1 to 4 carbon atoms or an alkenyl group having from 2 to 4 carbon atoms.

Specific examples include

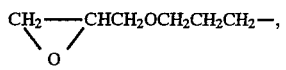

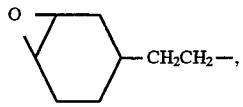

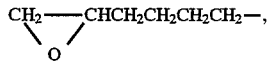

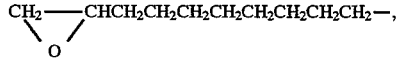

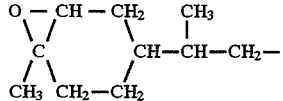

The (meth)acryloxy group-containing organic group is represented by the following formulas

wherein each $R^5$ represents a divalent hydrocarbon group having from 1 to 8 carbon atoms.

The amino group-containing organic groups include those groups of the following general formulas of $H_2NR^6$—, $R^7HNR^6$— and $R^8{}_2NR^6$— wherein $R^6$ is a divalent hydrocarbon group having from 1 to 10 carbon atoms which may have a NH bond therein, and $R^7$ and $R^8$ are, respectively, an alkyl group having from 1 to 10 carbon atoms, a phenyl group or a benzyl group.

Specific examples of the amino group-containing organic group include $H_2N(CH_2)_3$—, $C_6H_5NH(CH_2)_3$—, $C_6H_5CH_2NH(CH_2)_3$—, $CH_3NH(CH_2)_3$—, $H_2N(CH_2)_2NH$ —(CH$_2$)$_3$—, H$_2$N(CH$_2$)$_6$NH(CH$_2$)$_3$—, H$_2$N(CH$_2$)$_2$NHCH$_2$—C$_6$H$_4$—(CH$_2$)$_2$—, H$_2$N(CH$_2$)$_2$NH(CH$_2$)$_2$NH(CH$_2$)$_3$—, H$_2$N—C$_6$H$_4$—, —(CH$_2$)$_{10}$—NH$_2$, —(CH$_2$)$_3$—N(CH$_3$)$_2$ and the like.

The hydroxyl group-containing organic group is represented by the formula of —R$^9$—OH wherein R$^9$ is an alkylene group having from 3 to 10 carbon atoms.

The siloxy group-containing organic group is represented by the following general formula

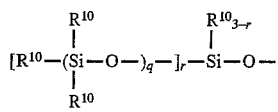

wherein R$^{10}$ represents a hydrogen atom or an alkyl, alkenyl or alkoxy group having from 1 to 10 carbon atoms or a phenyl group, q is zero or an integer of from 1 to 100, and r is 0, 1, 2 or 3. Specific examples include (CH$_3$)$_3$SiO—, (CH$_3$)$_2$Si—O—, CH$_2$=CH—(CH$_3$)$_2$Si—O—, C$_6$H$_5$(CH$_3$)$_2$Si—O—, (CH$_3$)$_3$Si—[O(CH$_3$)$_2$Si]$_{10}$—O—, (CH$_3$O)$_3$Si—[O(CH$_3$)$_2$Si]$_{20}$—O—, and the like.

The ether group-containing organic group is represented by the general formula of R$^{11}$—O—R$^{12}$— wherein R$^{11}$ represents an alkyl group or alkenyl group having from 1 to 10 carbon atoms, and R$^{12}$ represents an alkylene group having at least one ether bond and having 1 to 10 carbon atoms. Specific examples include CH$_2$=CH—CH$_2$—O—CH$_2$CH$_2$—O—(CH$_2$)$_3$—, CH$_2$=C(CH$_3$)—O—CH$_2$CH$_2$—O—(CH$_2$)$_3$— and the like.

The ketone bond-containing organic group is represented by the general formula of R$^{13}$C(O)CR$^{14}$— wherein R$^{13}$ represents a hydrogen atom or an alkyl group having from 1 to 10 carbon atoms, and R$^{14}$ represents an alkylene group which may contain a carboxylic acid residue and having from 2 to 10 carbon atoms. Specific examples include

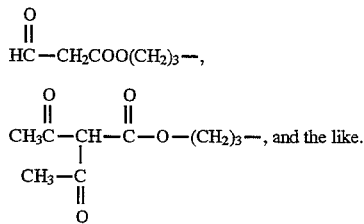

The ester group-containing organic group is represented by the general formula of R$^{15}$COO— wherein R$^{15}$ represents an alkyl or alkenyl group having 1 to 18 carbon atoms with or without a divalent hydrocarbon group having from 1 to carbon atoms and bonded to the oxygen. Specific examples include C$_{17}$H$_{35}$—COO—(CH$_2$)$_3$—, CH$_2$=CHC$_{15}$H$_{30}$—COO—(CH$_2$)$_3$— and the like.

The phosphorus-containing organic group is represented by (R$^{16}$)$_2$P(CH$_2$)$_n$— where each R$^{16}$ represents a saturated or unsaturated monovalent hydrocarbon group having from 1 to 6 carbon atoms and n is an integer of from 1 to 10.

In the formulas (1) and (2), R$^1$ represents a substituted or unsubstituted monovalent hydrocarbon group having from 1 to 8 carbon atoms. Specific and preferred examples include —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)CH$_3$, —C(CH$_3$)$_3$, —(CH$_2$)$_2$—CH$_2$—CH$_3$, —C$_6$H$_5$, and those groups mentioned above and substituted with a halogen atom such as fluorine, chlorine or the like.

R$^2$ represents a hydrogen atom, a lower alkyl group having from 1 to 5 carbon atoms and a lower alkenyl group having from 2 to 5 carbon atoms. Specific examples of the group represented by R$^2$ include —H, —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)CH$_3$, —C(CH$_3$)$_3$, —CH=CH$_2$, —CH$_2$CH=CH$_2$, —C(CH$_3$)=CH$_2$ and the like.

In the general formula (2), a is 0, 1 or 2.

Specific examples of the functional group-containing compounds are mentioned below: CH$_2$=CHSi(OCH$_3$)$_3$, CH$_2$=CHSi(CH$_3$)(OCH$_3$)$_2$, CH$_2$=CHSi(OCH$_2$CH$_3$)$_3$, CH$_2$=CHSi(CH$_3$)(OCH$_3$)$_2$, CH$_2$=CHCH$_2$Si(OCH$_3$)$_2$, CH$_2$=CHCH$_2$Si(CH$_3$)(OCH$_3$)$_2$, CH$_2$=CHCH$_2$Si(OCH$_2$CH$_3$)$_2$, CH$_2$=CH(CH$_2$)$_4$Si(OCH$_3$)$_3$, CH$_2$=CH(CH$_2$)$_4$Si(CH$_3$)(OCH$_3$)$_2$, CH$_2$=CH(CH$_2$)$_4$Si(OCH$_2$CH$_3$)$_3$, CH$_2$=CH(CH$_2$)$_4$(CH$_3$)Si(OCH$_3$)$_2$, CH$_2$=CH(CH$_2$)$_8$Si(OCH$_3$)$_3$, CH$_2$=CH(CH$_2$)$_8$Si(OCH$_2$CH$_3$)$_3$, CH$_2$=CHO(CH$_2$)$_3$Si(OCH$_3$)$_3$, CH$_2$=CHO(CH$_2$)$_3$Si(OCH$_2$CH$_3$)$_3$ and the like;

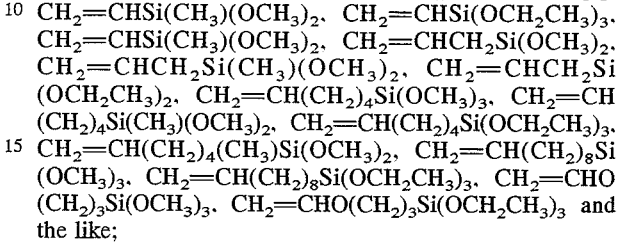

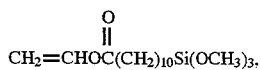

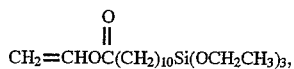

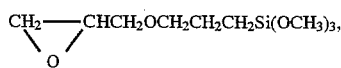

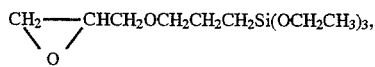

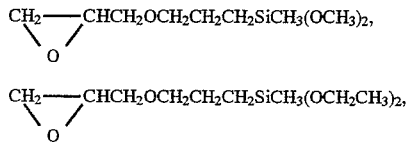

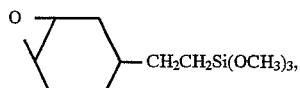

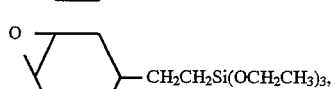

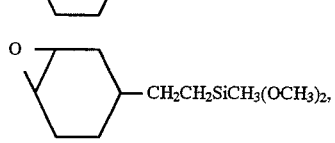

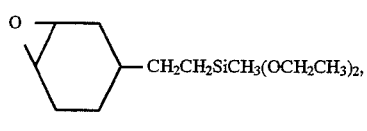

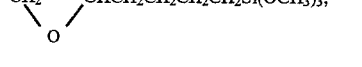

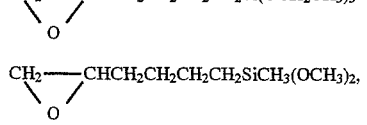

11
-continued $$CH_2\underset{\diagdown O \diagup}{-\!\!\!-\!\!\!-}CHCH_2CH_2CH_2CH_2SiCH_3(OCH_2CH_3)_2,$$

$$CH_2\underset{\diagdown O \diagup}{-\!\!\!-\!\!\!-}CHCH_2CH_2CH_2CH_2CH_2CH_2CH_2Si(OCH_3)_3,$$

$$CH_2\underset{\diagdown O \diagup}{-\!\!\!-\!\!\!-}CHCH_2CH_2CH_2CH_2CH_2CH_2CH_2Si(OCH_2CH_3)_3,$$

$$CH_2\underset{\diagdown O \diagup}{-\!\!\!-\!\!\!-}CHCH_2CH_2CH_2CH_2CH_2CH_2CH_2SiCH_3(OCH_3)_2,$$

$$CH_2\underset{\diagdown O \diagup}{-\!\!\!-\!\!\!-}CHCH_2CH_2CH_2CH_2CH_2CH_2CH_2SiCH_3(OCH_2CH_3)_2,$$

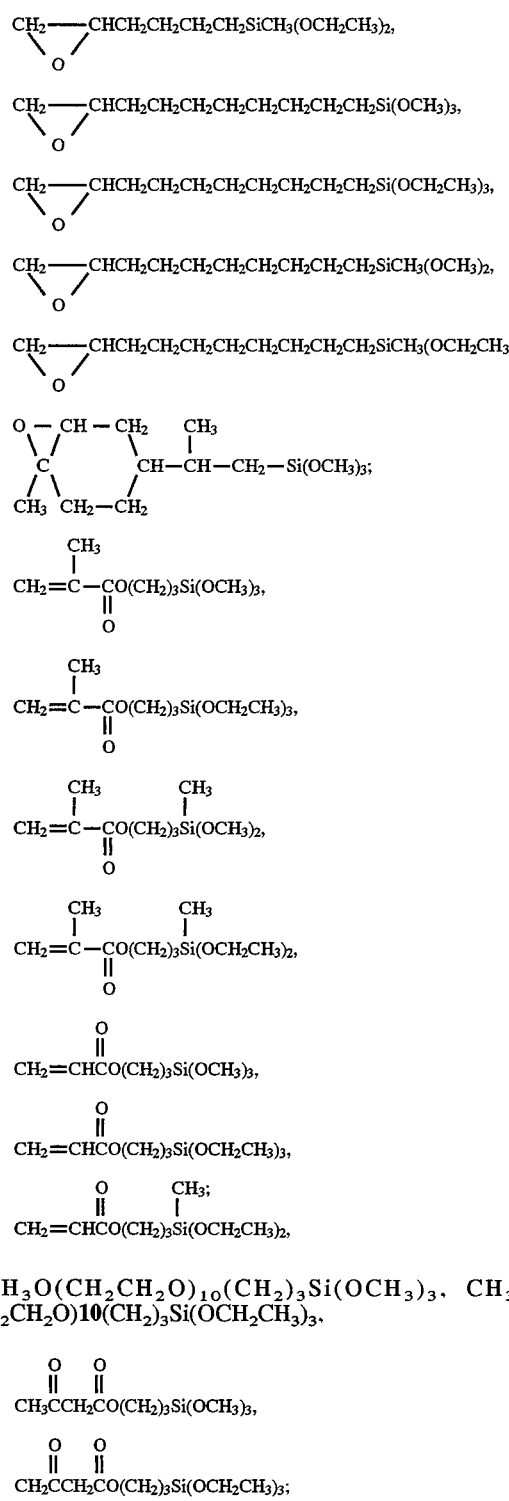

$$CH_2=\underset{\underset{O}{\overset{\|}{}}}{\overset{\overset{CH_3}{|}}{C}}-CO(CH_2)_3Si(OCH_3)_3,$$

$$CH_2=\underset{\underset{O}{\overset{\|}{}}}{\overset{\overset{CH_3}{|}}{C}}-CO(CH_2)_3Si(OCH_2CH_3)_3,$$

$$CH_2=\underset{\underset{O}{\overset{\|}{}}}{\overset{\overset{CH_3}{|}}{C}}-\overset{\overset{CH_3}{|}}{C}O(CH_2)_3Si(OCH_3)_2,$$

$$CH_2=\underset{\underset{O}{\overset{\|}{}}}{\overset{\overset{CH_3}{|}}{C}}-\overset{\overset{CH_3}{|}}{C}O(CH_2)_3Si(OCH_2CH_3)_2,$$

$$CH_2=CH\overset{\overset{O}{\|}}{C}O(CH_2)_3Si(OCH_3)_3,$$

$$CH_2=CH\overset{\overset{O}{\|}}{C}O(CH_2)_3Si(OCH_2CH_3)_3,$$

$$CH_2=CH\overset{\overset{O}{\|}}{C}O(CH_2)_3\overset{\overset{CH_3}{|}}{Si}(OCH_2CH_3)_2;$$

$CH_3O(CH_2CH_2O)_{10}(CH_2)_3Si(OCH_3)_3$, $CH_3O(CH_2CH_2O)_{10}(CH_2)_3Si(OCH_2CH_3)_3$, $$CH_3\overset{\overset{O}{\|}}{C}CH_2\overset{\overset{O}{\|}}{C}O(CH_2)_3Si(OCH_3)_3,$$

$$CH_2\overset{\overset{O}{\|}}{C}CH_2\overset{\overset{O}{\|}}{C}O(CH_2)_3Si(OCH_2CH_3)_3;$$

$(C_6H_5)_2P(CH_2)_2Si(OCH_3)_3$, $(C_6H_5)_2P(CH_2)_2Si(OCH_2CH_3)_3$, $(C_6H_5)_2P(CH_2)_3Si(OCH_3)_3$, and $(C_6H_5)_2P(CH_2)_3Si(OCH_2CH_3)_3$; $(CH_3)_2N(CH_2)_3Si(OCH_3)_3$, $(CH_3CH_2CH_2CH_2)_2N(CH_2)_3Si(OCH_3)_3$ and $(CH_3CH_2CH_2CH_2)_2N(CH_2)_3Si(OCH_2CH_3)_3$; $H_2N(CH_2)_2NH(CH_2)_3Si(OCH_3)_3$, $H_2N(CH_2)_2NH(CH_2)_3Si(OCH_2CH_3)_3$, $H_2N(CH_2)_2NH(CH_2)_3Si(CH_3)(OCH_3)_2$, $H_2N(CH_2)_2NH(CH_2)_3Si(CH_3)(OCH_2CH_3)_2$, $H_2N(CH_2)_6NH(CH_2)_3Si(OCH_3)_3$, $H_2N(CH_2)_6NH(CH_2)_3Si(OCH_2CH_3)_3$,

12

$H_2N(CH_2)_6NHCH_2$—$C_6H_5$—$(CH_2)_2Si(OCH_3)_3$, $H_2N(CH_2)_6NHCH_2$—$C_6H_5$—$(CH_2)_2Si(OCH_2CH_3)_3$, $H_2N(CH_2)_2NH(CH_2)_2NH(CH_2)_3Si(OCH_3)_3$, $H_2N(CH_2)_2NH(CH_2)_2NH(CH_2)_3Si(OCH_2CH_3)_3$, $H_2N$—$C_6H_5$—$Si(OCH_3)_3$, and $H_2N$—$C_6H_5$—$Si(OCH_2CH_3)_3$; $CH_2$=$C(CH_3)OCH_2CH_2)(CH_2)_3Si(OCH_3)_3$ and $CH_2$=$C(CH_3)OCH_2CH_2)(CH_2)_3Si(OCH_2CH_3)_3$;

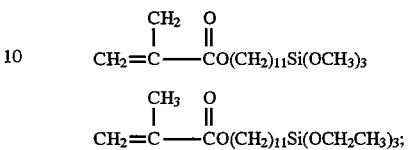

$H_2N(CH_2)_3Si(OCH_3)_3$, $H_2N(CH_2)_3Si(OCH_2CH_3)_3$, $H_2N(CH_2)_3Si(CH_3)(OCH_3)_2$, $H_2N(CH_2)_3Si(CH_3)(OCH_2CH_3)_2$, $C_6H_5NH(CH_2)_3Si(OCH_3)$, $C_6H_5NH(CH_2)_3Si(OCH_2CH_3)$, $C_6H_5CH_2NH(CH_2)_3Si(OCH_3)$ and $C_6H_5CH_2NH(CH_2)_3Si(OCH_2CH_3)$; $CH_3NH(CH_2)_3Si(OCH_3)_3$ and $CH_3NH(CH_2)_3Si(OCH_2CH_3)_3$; $(CH_3O)_3Si(CH_2)_3NH(CH_2)_2NH(CH_2)_3Si(OCH_3)$, $(CH_3CH_2O)_3Si(CH_2)_3NH(CH_2)_2NH(CH_2)_3SiOCH_2CH_3)$, $(CH_3O)_3Si(CH_2)_3NH(CH_2)_3Si(OCH_3)$ and $(CH_3CH_2O)_3Si(CH_2)_3NH(CH_2)_3Si(OCH_2CH_3)$; and $[(CH_3)_3SiO]$—$Si(OCH_3)_3$, $[(CH_3)_3SiO]_2$—$Si(OCH_3)_2$, $[(CH_3)_3SiO]_3$—$SiOCH_3$, $[(CH_3)_3SiO]$—$Si(OCH_2CH_3)_3$, $[(CH_3)_3SiO]_2$—$Si(OCH_2CH_3)_3$ and $[(CH_3)_3SiO]_3$—$SiOCH_2CH_3$.

The organic functional group-containing alkoxysilanes which are mono, di and tri alkoxysilanes may be used singly or in combination. Accordingly, when used in combination, the alkoxysilanes used should preferably have the same organic functional group but may have different groups represented by $R^1$ and $R^2$ in the formula (2). Accordingly, $R^1$ and $R^2$ in the formula (1) may, respectively, have different types of groups derived from the different groups represented by $R^1$ and $R^2$ in the formula (2).

The organic functional group-containing groups represented by Y serve as a reactive group in final organopolysiloxanes.

Of the organic functional groups, an epoxy or (meth) acryloxy group-bearing group is preferred because of its high reactivity. Especially, preferable epoxy group-containing compounds include γ-glycidoxypropyltrimethoxysilane, γ-glycidoxypropylmethyldimethoxysilane, 2-[3,4-epoxycyclohexyl]ethylmethyldimethoxysilane and 2-[3,4-epoxycyclohexyl]ethyltrimethoxysilane. Preferable (meth) acryloxy-group-containing compounds include γ-methacryloxypropyltrimethoxysilane, γ-acryloxypropyltrimethoxysilane, γ-methacryloxypropylmethyldimethoxysilane, γ-acryloxypropylmethyldimethoxysilane and the like.

In the practice of the invention, when the organic functional group-bearing alkoxysilane is subjected to hydrolysis and polycondensation reaction in the presence of a substantially neutral fluorine-containing compound as a catalyst, the organic functional group-containing organopolysiloxane of the average compositional formula (1) can be obtained.

In order to further modify the organopolysiloxanes to impart desired properties different from those of organopolysiloxanes derived from the functional group-containing alkoxysilane alone of the general formula (2), organic functional group-free alkoxysilanes, siloxanes and/or silicones obtained from these alkoxysilanes and siloxanes may be added.

The organic functional group-free, alkoxysilanes and siloxanes are of the following formulas (3) and (4), respectively

wherein $R^1$ and $R^2$ have, respectively, the same meanings as defined hereinbefore with respect to the formulas (1) and (2), h is zero or an integer of 1, 2 or 3, c is a value within a range of $0 \leq c \leq 2$, d is a value within a range of $0 \leq d \leq 3$ provided that $0.01 \leq c+d \leq 3$.

The alkoxysilane of the general formula (3) includes a mono, di, tri or tetraalkoxysilane. These alkoxysilanes may be used singly or in combination depending on the purpose as will be described hereinafter. The groups represented by $R^1$ and $R^2$ are those described with respect to the formulas (1) and (2) and are not set out herein.

Specific examples of the alkoxysilanes of the general formula (3) are shown below.

Tetra and Tri Alkoxysilanes $Si(OCH_3)_4$, $Si(OCH_2CH_3)_4$, $Si(OCH_2CH_2CH_3)_4$, $Si(OCH_2CH_2CH_2CH_3)_4$, $CH_3Si(OCH_3)_3$, $CH_3Si(OCH_2CH_3)_3$, $CH_3Si(OCH_2CH_2CH_3)_3$, $CH_3Si(OCH_2CH_2CH_2CH_3)_3$, $CH_3Si(OCH(CH_3)=CH_2)_3$, $CH_3CH_2Si(OCH_3)_3$, $CH_3CH_2Si(OCH_2CH_3)_3$, $CH_3CH_2Si(OCH_2CH_2CH_3)_3$, $CH_3CH_2Si(OCH_2CH_2CH_2CH_3)_3$, $CH_3CH_2Si(OC(CH_3)=CH_2)_3$, $CH_3CH_2CH_2Si(OCH_3)_3$, $CH_3CH_2CH_2Si(OCH_2CH_3)_3$, $CH_3CH_2CH_2Si(OCH_2CH_2CH_3)_3$, $CH_3(CH_2)_5Si(OCH_3)_3$, $CH_3CH_2CH_2Si(OCH_2CH_2CH_2CH_3)_3$, $CF_3CH_2CH_2Si(OCH_3)_3$, $CH_3CH_2CH_2Si(OC(CH_3)=CH_2)_3$, $CH_3CH_2CH_2CH_2Si(OCH_3)_3$, $CH_3CH_2CH_2CH_2Si(OCH_2CH_3)_3$, $CH_3CH_2CH_2CH_2Si(OCH_2CH_2CH_3)_3$, $CH_3CH_2CH_2CH_2Si(OCH_2CH_2CH_2CH_3)_3$, $CH_3CH_2CH_2CH_2Si(OC(CH_3)=CH_2)_3$, $CF_3CF_2CF_2CF_2CH_2CH_2Si(OCH_3)_3$, A—Si(OCH$_3$)$_3$, A—Si—(OCH$_2$CH$_3$)$_3$, A—Si(OCH$_2$CH$_2$CH$_3$)$_3$, A—Si(OCH$_2$CH$_2$CH$_2$CH$_3$)$_3$, A—Si(OC(CH$_3$)=CH$_2$)$_3$, and A—CH$_2$CH$_2$Si(OCH$_3$)$_3$ wherein A represents a benzene ring.

Dialkoxysilanes $(CH_3)_2Si(OCH_3)_2$, $(CH_3)_2Si(OCH_2CH_3)_2$, $(CH_3)_2Si(OCH_2CH_2CH_3)_2$, $(CH_3)_2Si(OCH_2CH_2CH_2CH_3)_2$, $(CH_3)_2Si(OC(CH_3)=CH_2)_2$, $(CH_3CH_2)_2Si(OCH_3)_2$, $(CH_3CH_2)_2Si(OCH_2CH_3)_2$, $(CH_3CH_2)_2Si(OCH_2CH_2CH_3)_2$, $(CH_3CH_2)_2Si(OC(CH_3)=CH_2)_2$, $(CH_3CH_2CH_2)_2Si(OCH_3)_2$, $(CH_3CH_2CH_2)_2Si(OCH_2CH_3)_2$, $(CH_3CH_2CH_2)_2Si(OCH_2CH_2CH_3)_2$, $(CH_3CH_2CH_2)_2Si(OCH_2CH_2CH_2CH_3)_2$, $(CH_3CH_2CH_2)_2Si(OC(CH_3)=CH_2)_2$, $(CH_3CH_2CH_2CH_2)_2Si(OCH_3)_2$, $(CH_3CH_2CH_2CH_2)_2Si(OCH_2CH_3)_2$, $(CH_3CH_2CH_2CH_2)_2Si(OCH_2CH_2CH_3)_2$, $(CH_3CH_2CH_2CH_2)_2Si(OCH_2CH_2CH_2CH_3)_2$, $(CH_3CH_2CH_2CH_2)_2Si(OC(CH_3)=CH_2)_2$, A$_2$—Si(OCH$_3$)$_2$, A$_2$—Si(OCH$_2$CH$_3$)$_2$, A$_2$—Si(OCH$_2$CH$_2$CH$_3$)$_2$, A$_2$—Si(OCH$_2$CH$_2$CH$_2$CH$_3$)$_2$, A$_2$—Si(OC(CH$_3$)=CH$_2$)$_2$, and A$_2$—Si(CH$_3$)(OCH$_3$)$_2$ wherein each A represents a benzene ring.

Monoalkoxysilanes $(CH_3)SiOCH_3$, $(CH_3)SiOCH_2CH_3$, $(CH_3)SiOCH_2CH_2CH_3$, $(CH_3)SiOCH_2CH_2CH_2CH_3$, $(CH_3)SiOC(CH_3)=CH_2$, $(CH_3)_3SiOH$, $(CH_3CH_2)_3SiOCH_3$ and $(CH_3CH_2)_3SiOCH_2CH_3$.

Examples of the organosiloxanes of the general formula (4) are those shown below.

$(CH_3O)_3Si—O—Si(OCH_3)_3$

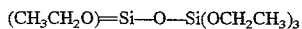

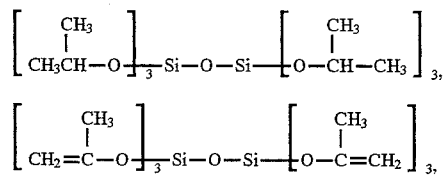

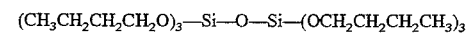

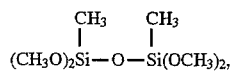

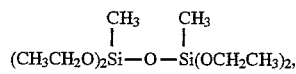

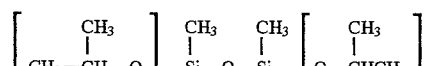

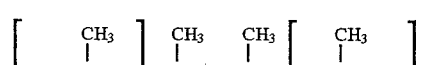

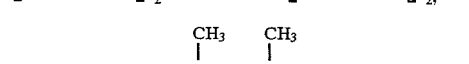

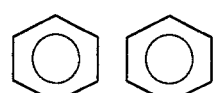

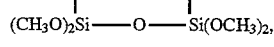

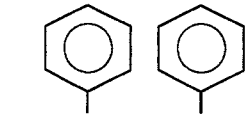

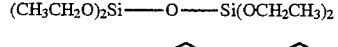

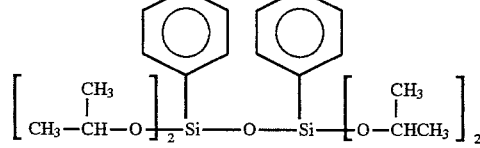

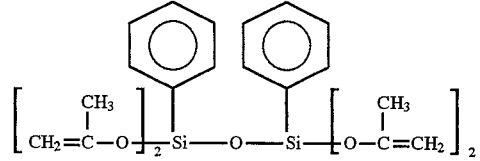

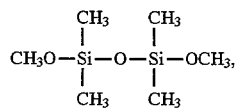

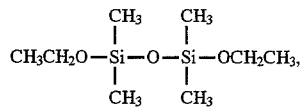

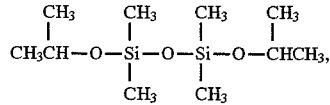

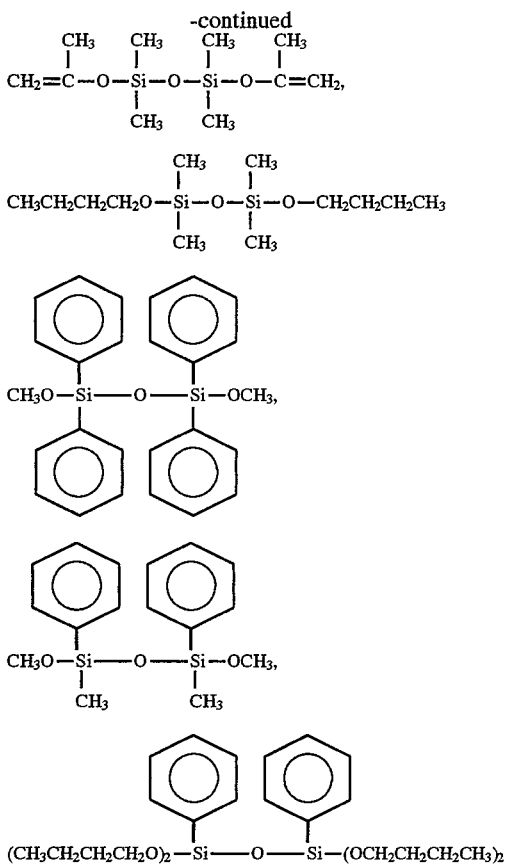

Further, silicone polymers which are obtained by hydrolysis of the alkoxysilanes of the general formula (3) and the siloxanes of the general formula (4) may also be used in the practice of the invention. These silicone polymers should preferably be derived from the alkoxysilanes and the alkoxy group-containing siloxanes mixed at a molar ratio between 100:1 to 1:100 with a degree of polymerization of up to $1×10^3$ and may be solid or liquid.

The silicone polymers or resins may have a linear, branched or cyclic structure or mixtures thereof. Aside from those set out above, commercially available silicone resins which have at least one alkoxy group having from 1 to 4 carbon atoms may also be used, if desired. Such commercially available silicone resins may have partially silanol groups therein.

Moreover, in the practice of the invention, silicone resins which have a silanol group at ends thereof may also be used in combination, if desired. Such resins may be commercially available from Shin-Etsu Chemical Co., Ltd. under the designations of KR-282, KR-311 and the like.

These alkoxysilanes, siloxanes and silicones derived therefrom may be used singly or in combination when employed along with the organic functional group-containing alkoxysilane of the formula (2).

The mixing ratio of these additional alkoxysilanes, siloxanes and silicones is not critical. Preferably, the alkoxysilane of the formula (2) should be used in an amount of from 0.1 to 100 wt %, more preferably from 1 to 100 wt %. If the content of the alkoxysilane of the formula (2) is less than 0.1 wt %, the organic functional group is not uniformly distributed in a final organopolysiloxane and its reactivity cannot be shown satisfactorily.

If mixed, the organic functional group-containing alkoxysilane of the formula (2) is preferably employed in combination with the alkoxysilane of the formula (3). This is because the use of the alkoxysilane of the formula (3) is ready for availability and is adapted to design a desired form of final organopolysiloxane, i.e. solid particles, a bulky mass, and a viscous, oily or liquid polymer or oligomer.

The starting material which comprises an essential ingredient of the alkoxysilane of the formula (2) with or without further addition of the alkoxysilane of the formula (3), the siloxane of the formula (4) and/or the silicone derived therefrom is subjected to hydrolysis or co-hydrolysis and polycondensation reaction in the presence of a substantially neutral fluorine-containing compound as a catalyst. The hydrolysis or co-hydrolysis (hereinafter referred to simply as hydrolysis) and polycondensation is usually effected at a temperature ranging from 0° C. to 100° C., preferably from 20° C. to 80° C. It will be noted that when water and a fluorine-containing compound are added to the starting material, the temperature of the reaction system increases but not exceeding the above temperature range. The hydrolysis and polycondensation is usually carried out under agitation, under which the reaction system is kept for aging for a time of 0.1 to 10 hours.

The catalyst of the substantially neutral fluorine-containing compound used in the present invention remarkably promote the hydrolysis and polycondensation reaction owing to its high catalytic activity. By this, water added to the hydrolysis is completely consumed with little alkoxy groups being left in the final polycondensate, thereby ensuring an organopolysiloxane which has such a structure or form as initially designed. In addition, unlike the hydrolysis using acid or base catalysts, the organic functional groups of the organic functional group-containing silane of the formula (2) other than the alkoxy group are scarcely impeded. It will be noted that although OH groups may be left on in very small amounts, the OH group can be removed by reaction of monoalkoxysilanes, if desired, as will be described hereinafter.

After completion of the reaction, the catalyst used is removed from the reaction system. To this end, the catalyst may be removed by filtration after distillation of alcohol by-products or after changing with a more hydrophobic organic solvent, followed by washing with water. A small amount of moisture left in the product may be removed by any known procedures including a procedure using a drying agent and an azeotropic dehydration procedure wherein the solvent used is evaporated off.

By the above procedure, the organic functional group-containing organopolysiloxane of the average compositional formula (1) is obtained.

The degree of polymerization of the organopolysiloxane is determined mainly by an amount of water used for the hydrolysis. Moreover, the form of the final organopolysiloxane, i.e. solid or liquid, is also determined depending on not only the amount of water used, but also the alkoxy functionality, i.e. the number of alkoxy groups, in a starting material and the amount of the catalyst.

With respect to the degree of polymerization, when a starting alkoxysilane used is, for instance, a monomer having one silicon atom from which there is obtained, from one mole of the starting alkoxysilane, an organic functional group-containing organopolysiloxane which consists of Z silicon atoms, it is sufficient to use $(Z-1)/Z$ moles of water at the time of the hydrolysis reaction. If water is used in an mount of 1 mole or over or in an amount equimolar to or greater than that of the starting alkoxysilane, the resultant organopolysiloxane tends to have a branched structure. The use of too great an amount of water may result in a powdery or bulky resin material although depending on the type of starting material, the amount of solvent and the like.

In the process of the invention, organic solvents may be used in the reaction system. Such solvents include, for example, alcohols, ethers, esters, ketones and the like. Specific examples include alcohols such as methyl alcohol, ethyl alcohol, 1-propyl alcohol, 2-propyl alcohol and the like, ethers such as diethyl ether, dipropyl ether and the like, esters such as methyl acetate, ethyl acetate, ethyl acetoacetate and the like, and ketones such as acetone, diethyl ketone, methyl ethyl ketone methyl isobutyl ketone, and the like. These solvents may be used in combination with non-polar solvents such as hexane, benzene, toluene, xylene and the like. If used, alcohols such as methyl alcohol and ethyl alcohol are preferred.

The amount of the solvent is from 0 to 1000 parts by weight, preferably from 20 to 500 parts by weight, per 100 parts by weight of the starting material. If the amount exceeds 1000 parts by weight, a reaction apparatus has to be made large in size and the pot yield lowers, with poor economy. If the amount of the solvent is less than 20 parts by weight, a homogeneous reaction system may not be attained in some case. In this sense, the use of the solvent is preferred.

In practice, it is preferred to drop a predetermined amount of water or an organic solvent diluted with water in a mixed system of a starting monomer material, a fluorine-containing compound catalyst and, optionally, an organic solvent. The catalyst may be added to water or the water-diluted organic solvent. It will be noted that if the mixed system is added to water or the water-diluted solvent, the reaction system is apt to gel and is not thus favorable.

The amount of water used for the hydrolysis should be not larger than 50 times by mole of all the alkoxy groups in a starting material. If the amount of water exceeds 50 times by mole, the pot yield lowers with poor economy. Within a range of ½ to 50 times by mole, the alkoxy groups in the starting material are fully hydrolyzed and substantially disappear. In some case, a small amount of OH groups may be left.

In order to minimize or fully eliminate the OH group being left, a monoalkoxysilane as set out with respect to the alkoxysilane of the formula (3) is added to the reaction system during the course of or after completion of the hydrolysis, followed by polycondensation. By this, if left, the OH group is silylated and little or no OH group is left in a final organopolysiloxane product. To this end, the monoalkoxysilane is added to a starting material. The amount of the monoalkoxysilane is not critical and is preferably at a molar ratio of the monoalkoxysilane and the organic functional group-containing alkoxysilane of the formula (2) or its mixture with a di or higher polyalkoxysilane of the formula (3), an organosiloxane of the formula (4) and/or the silicone derived therefrom of 0.01:3 to 1:3, more preferably from 0.1:1 to 1:1.

If the amount of water is less ½ times by mole of the alkoxy groups in the starting material, the alkoxy group is invariably left in a final product.

As stated hereinbefore, the degree of polymerization is determined mainly by the amount of water. The control in amount of water enables one to cover a wide variety of products including a dimer having two Si atoms and resins having about 10,000 Si atoms. The liquid oligomers, liquid polymers, solid but bulky polymers and resin particles can be prepared according to the process of the invention. The conditions for the respective forms of the organopolysiloxanes are described.

When using a starting material which comprises the organic functional group-containing alkoxysilane of the formula (2) and, optionally, the alkoxysilane of the formula (3), the alkoxysiloxane of the formula (4) and/or the silicone derived from the alkoxysilane of the formula (3) and the alkoxysiloxane of the formula (4), the hydrolysis and polycondensation reactions are carried out in the presence of a substantially neutral fluorine-containing compound in such a way that water is added to in a controlled amount of within a range of less than ½ times by mole of the total moles of the alkoxy groups in the starting material. There are obtained dimers to polymers having approximately 10,000 Si atoms which have, in the molecule, both the organic functional group and the alkoxy group or groups derived from the compound of the formula (2) and/or the compounds of the formulas (3) and (4) and/or the silicone. More particularly, only by properly controlling the amount of water being added, oligomers and polymers having different degrees of polymerization can be readily obtained. The fluorine-containing compound ensures a very sharp distribution in degree of polymerization, so that a relatively high yield of an intended oligomer or polymer can be attained. In the practice of the invention, it is not essentially required to individually obtain, for example, a dimer, a trimer or the like oligomer but to obtain an oligomer or polymer having a major proportion of an intended degree of polymerization.

The oligomers having up to about ten Si atoms are effective for use as a crosslinking agent, a modifier, such as a kind of silane coupling agent, for synthetic or natural resins, a reactive diluent and the like. The polymers may also be used for adhesive materials, coating materials, sealants and the like.

For a low degree of polymerization or oligomerization, p should have a value within $1 \leq p \leq 2$. This value of p can be readily attained by controlling the amount of water as will be seen in examples appearing hereinafter.

As defined hereinbefore, if used in combination, the alkoxysilane of the formula (3), the alkoxysiloxane of the formula (4) and/or the silicone derived therefrom may be used in an amount up to 99.9 wt %.

The oligomer and polymer prepared in this manner may have linear, branched, cyclic or mixed structures thereof.

When using water in an amount of ½ to 50 times by mole relative to the total alkoxy groups in starting material, oligomers or polymers having an alkoxy group left therein cannot be obtained. However, only a slight amount of OH group may be, in some case, left.

According to the process of the invention which makes use of a highly active, substantially neutral fluorine-containing compound as a catalyst, when the silane of the formula (2) is subjected to hydrolysis and polycondensation using water in such an amount as set out above, a viscous liquid substance is obtained although depending on the number of the alkoxy groups in the starting silane and the amount of water within the above-defined range. In the practice of the invention, it is preferred that when measured at 25° C. by use of an ordinary rotaviscometer, the resultant liquid substance has a viscosity in the range of 10 cps., to 100,000 cps, more preferably from 100 cp., to 10,000 cps.

In order to improve miscibility with other types of resins, the oligomer, and polymer obtained by the process of the invention should preferably be prepared using an organic functional group-containing and/or an organic functional group-free alkoxysilane having a phenyl group in the molecule singly or in combination with other starting materials. By the incorporation of the phenyl group in final products, the miscibility with other resins improved along with an improved refractive index. The phenyl group-bearing alkoxysilanes are those indicated hereinbefore. The molar ratio of the phenyl group and Si in the starting material is preferably 0.01:1 to 0.9:1. If the phenyl group exceeds 0.9, a liquid substance may not be obtained. More preferably, a molar ratio of the phenyl group and Si is 0.3:1 to 0.7:1.

If at least 70 wt % of tri, tetra and/or higher polyalkoxysilane (whichever organic functional group-containing or free alkoxysilane) and/or siloxane and/or silicone are used and water is added in large excess, say, 1 to 50 times by mole larger than the total alkoxy groups in the starting material, solid particles which are individually porous and fine are obtained. If the amount of water is less than the above range and/or mono and/or di alkoxysilanes are present in larger amounts, viscous polymers or bulky mass of the organopolysiloxane may be obtained.

It should be noted that the form of the final product is greatly influenced by the amount of water and the alkoxy functionality in a starting material but the amount of water, the alkoxy functionality, the amount of the catalyst and reaction temperature are, more or less, interrelated with one another. The minor difference in these factors may result in a difference in form of a final product.

Solid particles have wide utility in the field of fillers for column, carriers for various types of enzymes and metallic compounds because of their porousness.

Now, reference is made to another embodiment of the invention. According to this embodiment, there is provided a process for preparing an organic functional organopolysiloxane of the following average compositional formula (1')

$$Y^1{}_m R^1{}_n Si(OR^2)_p O_{(4-m-n-p)/2} \qquad (1')$$

wherein $Y^1$ represents an organic group having a polymer moiety which comprises aromatic vinyl recurring units, ether recurring units or amide recurring units, $R^1$, $R^2$, m, n, m have, respectively, the same meanings as defined with respect to the formula (1), the process comprising subjecting an organic functional group-containing alkoxysilane of the following general formula (2')

$$Y^1 - SiR^1{}_a(OR^2)_{3-a} \qquad (2')$$

wherein $Y^1$, $R^1$ and $R^2$ have, respectively, the same meanings as defined above, a is $0 \leq a \leq 2$ as defined with respect to the formula (2), and subjecting the organic functional alkoxysilane to hydrolysis and polycondensation in the presence of a substantially neutral fluorine-containing compound.

In this embodiment, the organic functional group represented by $Y^1$ differs from those of the first embodiment.

$Y^1$ represents an organic group having a polymer moiety. The polymer moiety has aromatic vinyl recurring units, ether recurring units or amide recurring units.

The aromatic vinyl recurring units-bearing organic group is represented by the following general formula

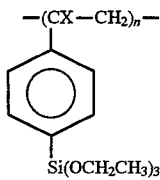

wherein X represents a hydrogen atom, an alkyl group having form 1 to 4 carbon atoms or an alkenyl group having from 1 to 4 carbon atoms, and n is an integer of from 10 to 1000.

The ether recurring units-beating organic group has the following general formula

$$-(C_m H_{2m} - O)_n-$$

wherein m is 1, 2, 3 or 4 and n is an integer of 2 to $1.0 \times 10^3$.

The amide recurring units-beating organic group is represented by capramide recurring units, hexamethyladipomide recurring units, hexamethylsebacamide recurring unit, ω-aminononaic acid recurring units and the like.

These polymer moieties are incorporated in order to improve miscibility with other synthetic and natural resins, like phenyl group, and the miscibility is improved over that using the phenyl group.

All the procedures set out in the first embodiment are applicable to this embodiment. For instance, the application of a monoalkoxysilane may also be applied to thereby obtaining polymer moiety-containing organopolysiloxanes which have OH groups reduced substantially to zero.

A further embodiment concerning the preparation of mercapto group-containing organopolysiloxanes is described.

The mercapto group-containing organopolysiloxanes can be prepared substantially in the same manner as set forth with respect to the first embodiment except that a mercapto group-containing alkoxysilane is hydrolyzed and polycondensed more efficiently in the presence of a catalyst system which contains a substantially neutral fluorine-containing compound and a small amount of an acid or base than in the presence of the fluorine-containing compound alone although a fluorine-containing compound alone may be used as a catalyst. Except this, the preparation of oligomers, polymers and solid particles proceeds substantially in the same manner as in the foregoing embodiments.

According to this embodiment, there is provided a process for preparing a mercapto group-containing organopolysiloxane of the following average compositional formula (1")

$$Y^2 R^1{}_n Si(OR^2)_p O_{(4-m-n-p)/2} \qquad (1")$$

wherein $Y^2$ represents an organic group having a mercapto group, $R^1$ represents at least one substituted or unsubstituted monovalent hydrocarbon group having from 1 to 8 carbon atoms, $R^2$ represents at least one member selected from a hydrogen atom, an alkyl group having from 1 to 4 carbon atoms and an alkenyl group having from 2 to 5 carbon atoms, $0 < m \leq 1$, $0 \leq n < 2$, and $0 \leq p \leq 2$ provided that $0 < m+n+p \leq 3.0$. This process comprises subjecting a mercapto functional group-containing alkoxysilane of the following general formula (2")

$$Y^2 - SiR^1{}_a(OR^2)_{3-a} \qquad (2")$$

wherein $Y^2$, $R^1$ and $R^2$ have, respectively, the same meanings as defined with respect to the formula (1"), a is an integer of 0, 1 or 2 as defined with respect to the formula (2), to hydrolysis and polycondensation in the presence of a substantially neutral fluorine-containing compound.

Among the organopolysiloxanes containing the mercapto group, those polysiloxanes having both a mercapto group and at least one alkoxy group are novel ones which has been hitherto unknown. Since mercapto group-containing organopolysiloxanes other than the novel ones can be prepared with the exception that better results in yield can be obtained using the catalyst system which is slightly different from that of the foregoing embodiments, the novel organopolysiloxanes and a process for preparing the same is described.

The novel mercapto group and alkoxy group-containing organopolysiloxane has the following average compositional formula (1")

$$Y^2_m R^1_n Si(OR^2)_p O_{(4-m-n-p)/2} \quad (1")$$

wherein $Y^2$, $R^1$, $R^2$ have, respectively, the same meanings as defined above but $0<m\leq 1$, $0\leq n\leq 2$, $1\leq p\leq 2$ provided that $0.1<m+n+p\leq 3$.

This type of organopolysiloxane having both a mercapto group and an alkoxy group can be prepared by subjecting a mercapto functional group-containing alkoxysilane of the following general formula (2")

$$Y^2-SiR^1_a(OR^2)_{3-a} \quad (2")$$

wherein $Y^2$, $R^1$ and $R^2$ have, respectively, the same meanings as defined with respect to the formula (1"), a is an integer of 0, 1 or 2 as defined with respect to the formula (2), to hydrolysis and polycondensation in the presence of a substantially neutral fluorine-containing compound in such a way that water is added to the alkoxysilane in an amount less than ½ of the total moles of the alkoxy groups present in the alkoxysilane.

The mercapto group-containing organic group represented by $Y^2$ includes, for example, $-C_3H_6SH$, $-C_2H_4-C_6H_4-CH_2SH$ and the like. Preferred examples of the mercapto group-containing compound of the formula (2") include γ-mercaptotrimethoxysilane.

As a matter of course, the mercapto functional group-containing alkoxysilane of the formula (2") may be used in combination with the alkoxysilane of the formula (3), the alkoxysiloxane of the general formula (4) and partially and fully hydrolyzed condensates of the compounds of the formula (3) and/or (4), as in the foregoing embodiments, while controlling the amount of water to be added.

It is preferred that an acid or base is added along with the substantially neutral fluorine-containing compound to facilitate the hydrolysis and polycondensation reaction. The amount of the acid or base is preferably within a range of from 0.00001 to 1 mole % based on the Si atoms present in the starting material.

The acids used in combination with the fluorine-containing compound include inorganic acid such as hydrochloric acid, nitric acid, phosphoric acid, sulfuric acid and the like, and organic acids such as methanesulfonic acid, para-toluenesulfonic acid, oxalic acid, maleic acid, trifluoroacetic acid and the like. The bases include inorganic bases such as sodium carbonate, sodium hydroxide, potassium hydroxide, ammonia, ammonium hydroxide and the like, and organic bases such as amines.

The organopolysiloxanes obtained by the above process include oligomers to polymers having up to about 10,000 Si atoms since the amount of water is less than ½ times the total alkoxy groups in a starting material or materials.

The invention is more particularly described by way of examples. Comparative examples are also shown.

EXAMPLE 1

0.17 mg (3 mmols) of KF and 261 g (14.7 mols) of water were placed in a 500 ml reactor equipped with an agitator, a thermometer and a condenser and mixed under agitation.

Thereafter, a mixture of 23.5 g (150 mmols) of tetramethoxysilane and 36.5 g (150 mmols) of γ-glycidoxypropyltrimethoxysilane was dropped into the mixture at room temperature in 3 minutes. After completion of the dropping the reaction system was agitated at room temperature for 1 minute, whereupon a colorless transparent reaction solution was changed into a white gel, followed by further agitation over 1 hour at room temperature. The resultant reaction solution was subjected to filtration under pressure and washed with distilled water then with acetone, followed by a vacuum dryer under conditions of 80° C. and 10 mmHg for 4 hours to remove the solvent therefrom thereby obtaining 31.8 g of γ-glycidoxypropyl group-containing organosilicone particles at a yield of 93%.

Figure 6:
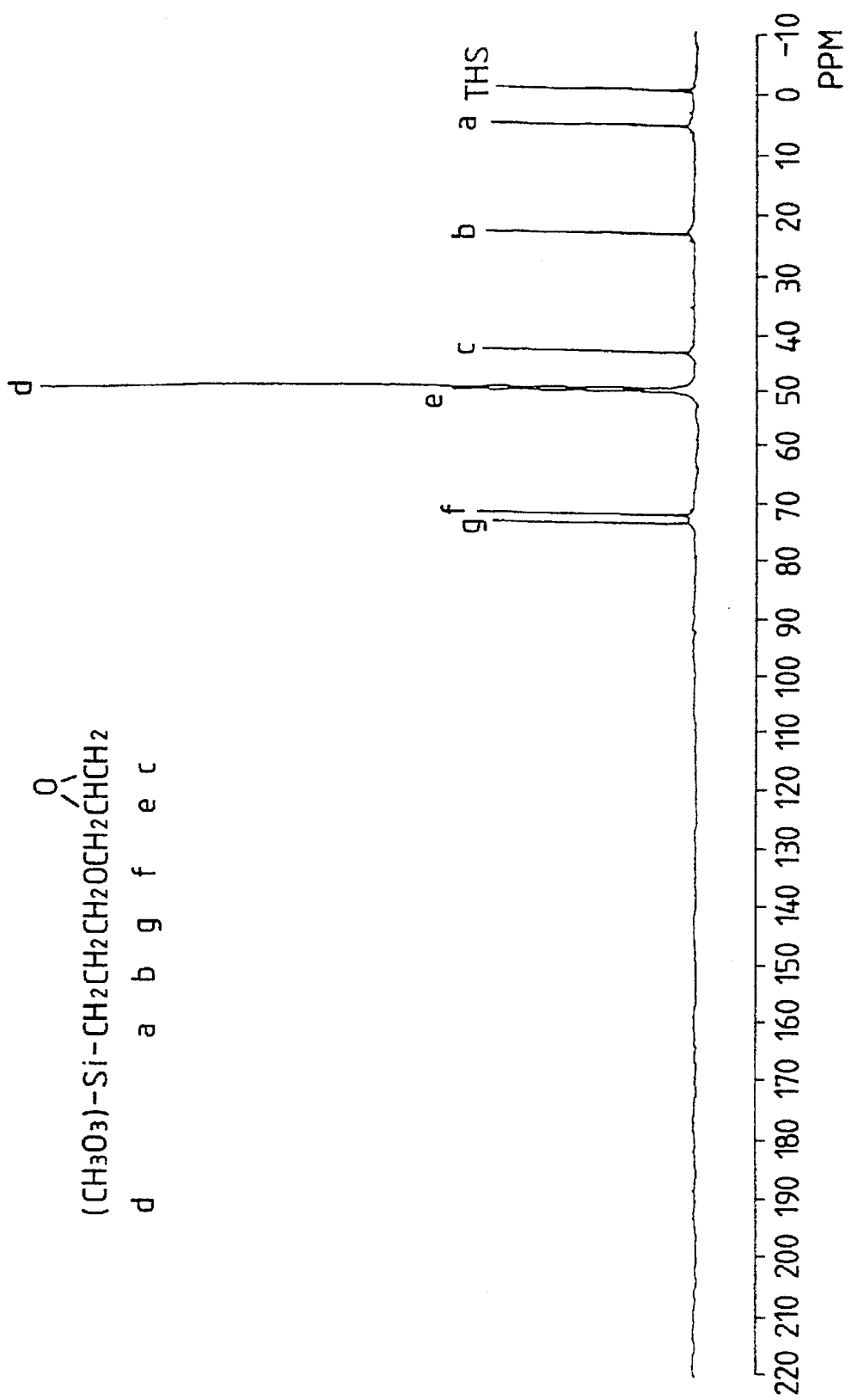
FIG. 6 is a CPMAS-$^{13}$C-NMR spectrum chart of γ-glycidoxypropyltrimethoxysilane used in Example 1 as a starting alkoxysilane.

The γ-glycidoxypropyl group-containing organosilicone particles had a bulk specific gravity of 0.27 g/cm³ and a specific surface area of 715 m²/g and were thus very porous. The particles were subjected to measurement of CPMAS-$^{13}$C-NMR spectra, with the results shown in FIG. 1. This reveals the existence of peaks at δ44.5 ppm and 51.5 ppm derived from the epoxy group. No peak is found as derived from a decomposed product, demonstrating that the epoxy group is stably left without decomposition (see FIG. 6 wherein there is a similar spectrum chart of starting γ-glycidoxypropyltrimethoxysilane).

Moreover, the particulate product was also subjected to a sodium thiosulfate method (Fifth Series of Jikken Kagaku Koza, Qualitative Confirmation Methods of Organic Compounds (Volume One), p. 518, published by Maruzen Co., Ltd.) for color reaction, with the result that the product assumed a red color and was thus confirmed as having the epoxy group.

Further, the product was subjected to a methyl Grignard method to quantitatively determine the $\equiv$Si—OH group (i.e. $\equiv$Si—OH was determined as a methane gas), revealing that the content was 19.6 mg equivalent/g. As a result of a microanalysis, the carbon content was found to be 30.7 wt %. From the above, it was found that the particulate product had the following compositional formula

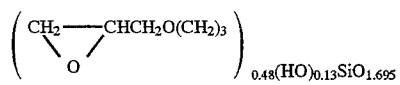

EXAMPLE 2

The general procedure of Example 1 was repeated for the reaction using 0.09 g (0.5 mmols) of $(NH_4)_2SiF_6$ instead of KF. One minute after the dropping, the reaction solution was changed into a white gel, followed by treating in the same manner as in Example 1 to obtain 30.4 g of γ-glycidoxypropyl group-containing organopolysiloxane particles at a yield of 89%. The particles had a bulk specific gravity of 0.28 g/cm³ with a specific surface area of 702 m²/g.

The particulate product was subjected to measurement of CPMAS-$^{13}$C-NMR spectra in the same manner as in Example 1, revealing that the epoxy group was not impeded and stably contained in the product. Further, the product was subjected to the color reaction in the same manner as in Example 1, thereby assuming a red color.

Also, the product was subjected to quantitative analysis of $\equiv$Si—OH group, with the result that its content was 21.3 mg equivalent/g. In addition, the results of microanalysis revealed that carbon was contained in an amount of 30.3 wt %. From the above, the product was found to have the following average compositional formula

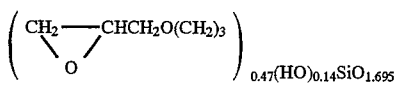

EXAMPLE 3

The general procedure of Example 1 was repeated for the reaction using 223.2 (12.4 moles) of water and 40.8 g (1.38 moles) of methanol. Five minutes after the dropping, the reaction solution was changed into a white gel, followed by treating in the same manner as in Example 1 to obtain 31.6 g of γ-glycidoxypropyl group-containing organopolysiloxane particles at a yield of 93%. The particles had a bulk specific gravity of 0.29 g/cm$^3$ with a specific surface area of 680 m$^2$/g.

EXAMPLE 4

23.5 g (150 mmols) of tetramethoxysilane and 36.5 g (150 mmols) of γ-glycidoxypropyltrimethoxysilane were placed in a 500 ml reactor equipped with an agitator, a thermometer and a condenser and mixed under agitation, in which 0.17 g (3 mmols) of KF dissolved in 264 g (14.667 mols) of water was dropped. Immediately after the dropping, the reaction solution was changed into a white gel, followed by treating in the same manner as in Example 1.

As a result, there was obtained 33.7 g of γ-glycidoxypropyl group-containing organopolysiloxane particulate product at a yield of 99%. The product was so porous as having a bulk specific gravity of 0.31 g/cm$^3$ with a specific surface area of 667 m$^2$/g.

EXAMPLE 5

The general procedure of Example 1 was repeated for the reaction using 22.6 g (96.0 mmols) of γ-glycidoxypropyltrimethoxysilane and 36.6 g (240 mmols) of tetramethoxysilane. One minute after the dropping, the reaction solution was changed into a white gel, followed by the treatment in the same manner as in Example 1.

As a result, there was obtained 30 g of γ-glycidoxypropyl group-containing organopolysiloxane particulate product at a yield of 99%. The product was very porous as having a bulk specific gravity of 0.17 g/cm$^3$ with a specific surface area of 770 m$^2$/g.

COMPARATIVE EXAMPLE 1

The general procedure of Example 1 was repeated for the reaction using 30.4 g (HCl: 300 mmols) of a 36% hydrochloric acid aqueous solution as a catalyst and 244.6 g (13.589 mols) of water. Five hours after the dropping, the reaction solution was changed into a white gel, followed by treatment in the same mariner as in Example 1.

Figure 2:
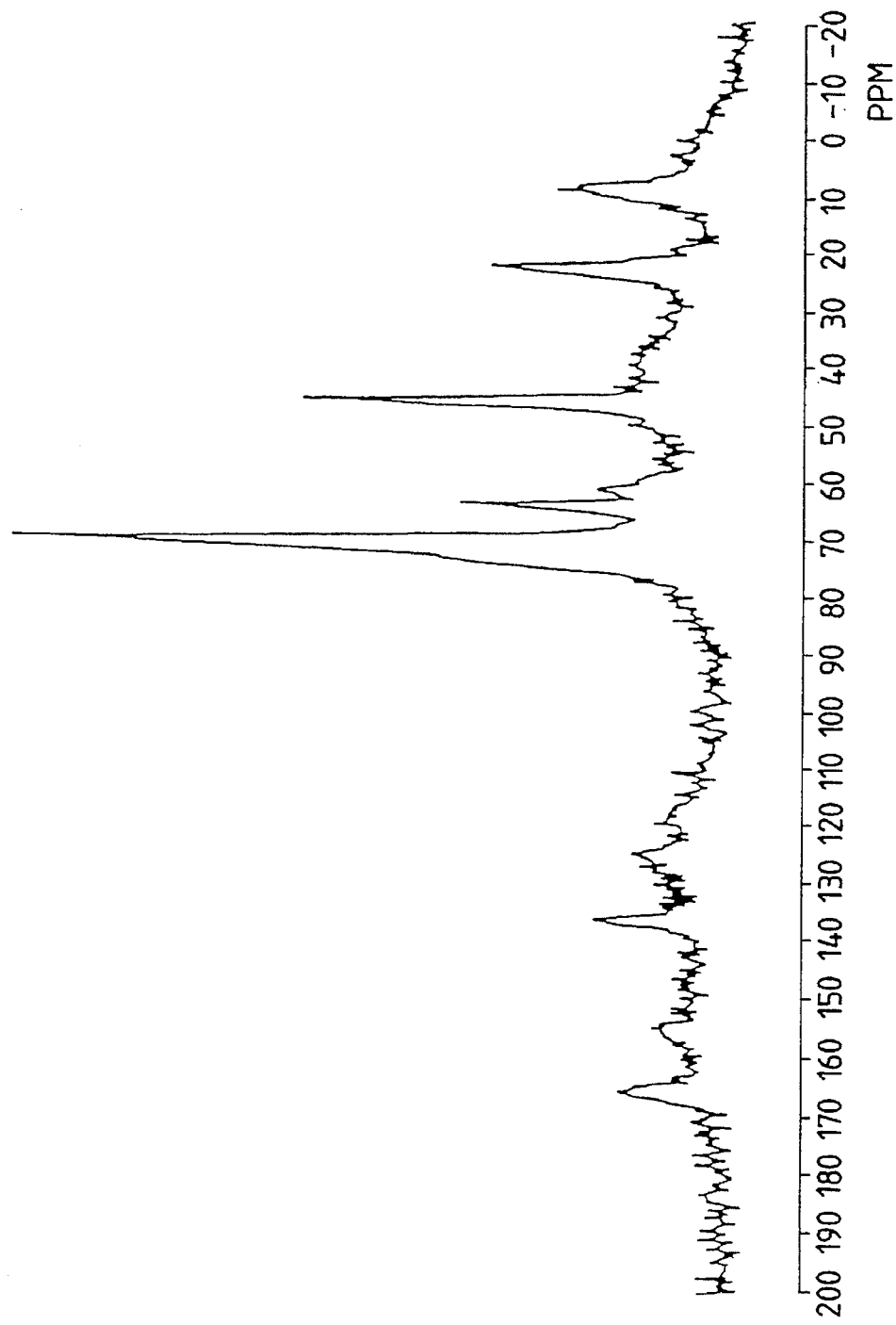
FIG. 2 is a CPMAS-$^{13}$C-NMR spectrum chart of organopolysiloxane particles obtained in Comparative Example 1.

As a result, there was obtained 29.2 g of an organopolysiloxane particulate product at a yield of 86%. The product had a bulk specific gravity of 0.86 g/cm$^3$ with a specific surface area of 143 m$^2$/g. The product was subjected to measurement of CPMAS-$^{13}$C-NMR spectra. The spectrum chart is shown in FIG. 2, revealing that the peaks derived from the epoxy group disappear and, instead, peaks derived from its decomposed product exist at δ values of 64.6 ppm and 71.0 ppm.

EXAMPLE 6

The general procedure of Example 1 was repeated using 22.2 g (150 mmols) of vinyltrimethoxysilane instead of γ-glycidoxypropyltrimethoxysilane for reaction in the same manner as in Example 1. Immediately after the dropping, the reaction solution was changed into a white gel, followed by treatment in the same mariner as in Example 1.

As a result, there was obtained 20 g of vinyl group-containing organopolysiloxane particulate product at a yield of 96%. The product was very porous as having a bulk specific gravity of 0.27 g/cm$^3$ with a specific surface area of 550 m$^2$/g.

Figure 3:
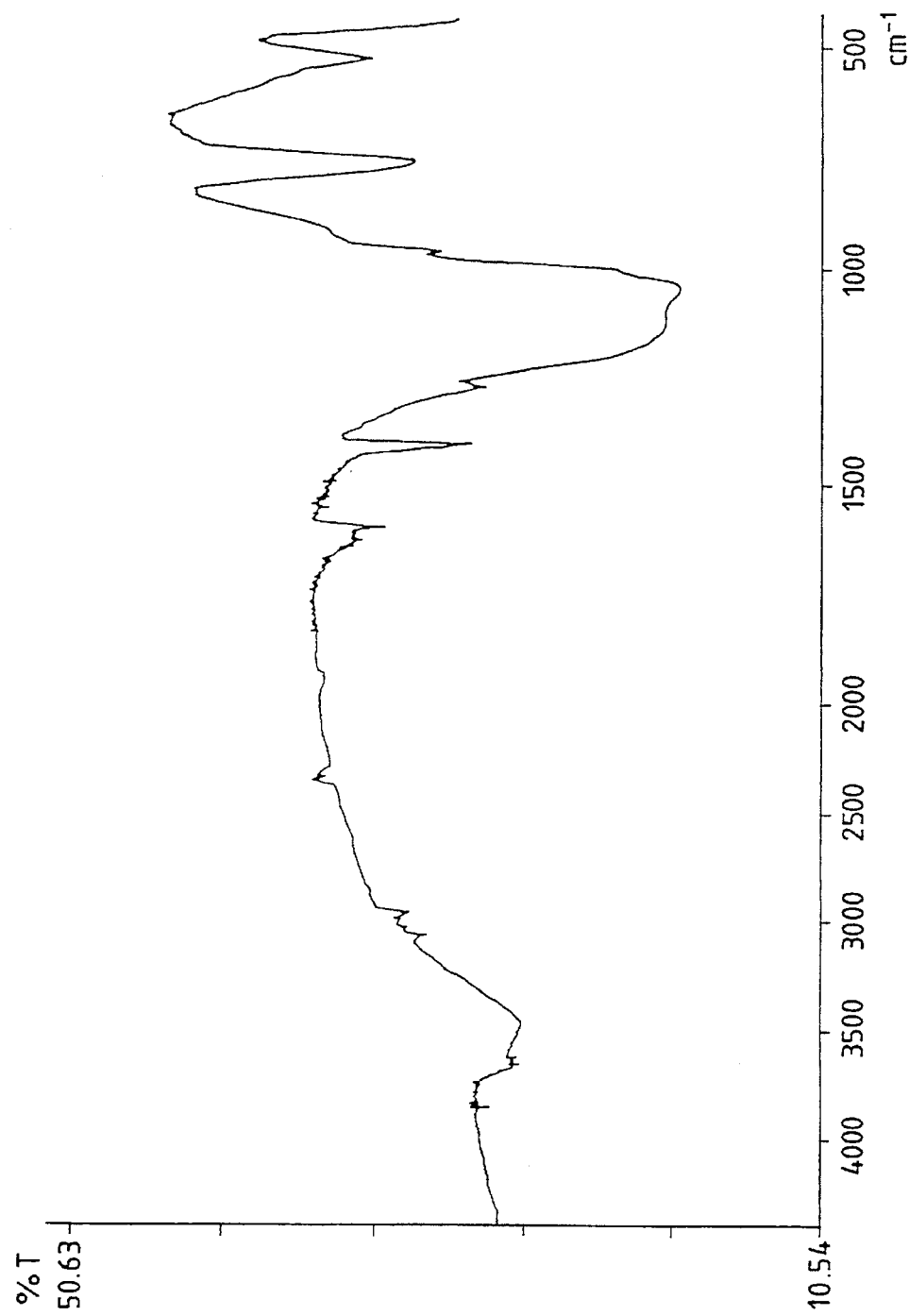
FIG. 3 is an FT-IR (Fourier transformation of infrared spectroscopy) chart of vinyl group-containing organopolysiloxane particles obtained in Example 6.

The particulate product was subjected to measurement of FT-IR. The resultant chart is shown in FIG. 3, revealing that the existence of the vinyl group was confirmed through the peak based on the C=C stretching vibrations at 1,604 cm$^{-1}$. The existence of the vinyl group was also confirmed by the color reaction according to the potassium permanganate method (Jikken Kagaku Kouza, fifth series (Volume 1), p. 132, published by Maruzen Co., Ltd.) where the purple solution was bleached.

Further, the results of the quantitative analysis of ≡Si—OH group revealed that its content was 31.4 mg equivalents/g. The results of microanalysis revealed that the carbon content was 16.7 wt %. From these data, it was confirmed that the vinyl group-containing organopolysiloxane product had an average compositional formula

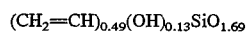

EXAMPLE 7

The general procedure of Example 1 was repeated except that 33.6 g (150 mmols) of styryltrimethoxysilane was used instead of γ-glycidoxypropyltrimethoxysilane for reaction in the same manner as in Example 1. Five minutes after the dropping, the reaction solution was changed into a white gel, followed by the treatment in the same manner as in Example 1.

As a result, there was obtained 27.3 g of styryl group-containing organopolysiloxane particulate product at a yield of 84%. The product was very porous as having a bulk specific gravity of 0.40 g/cm$^3$ with a specific surface area of 410 m$^2$/g.

Figure 4:
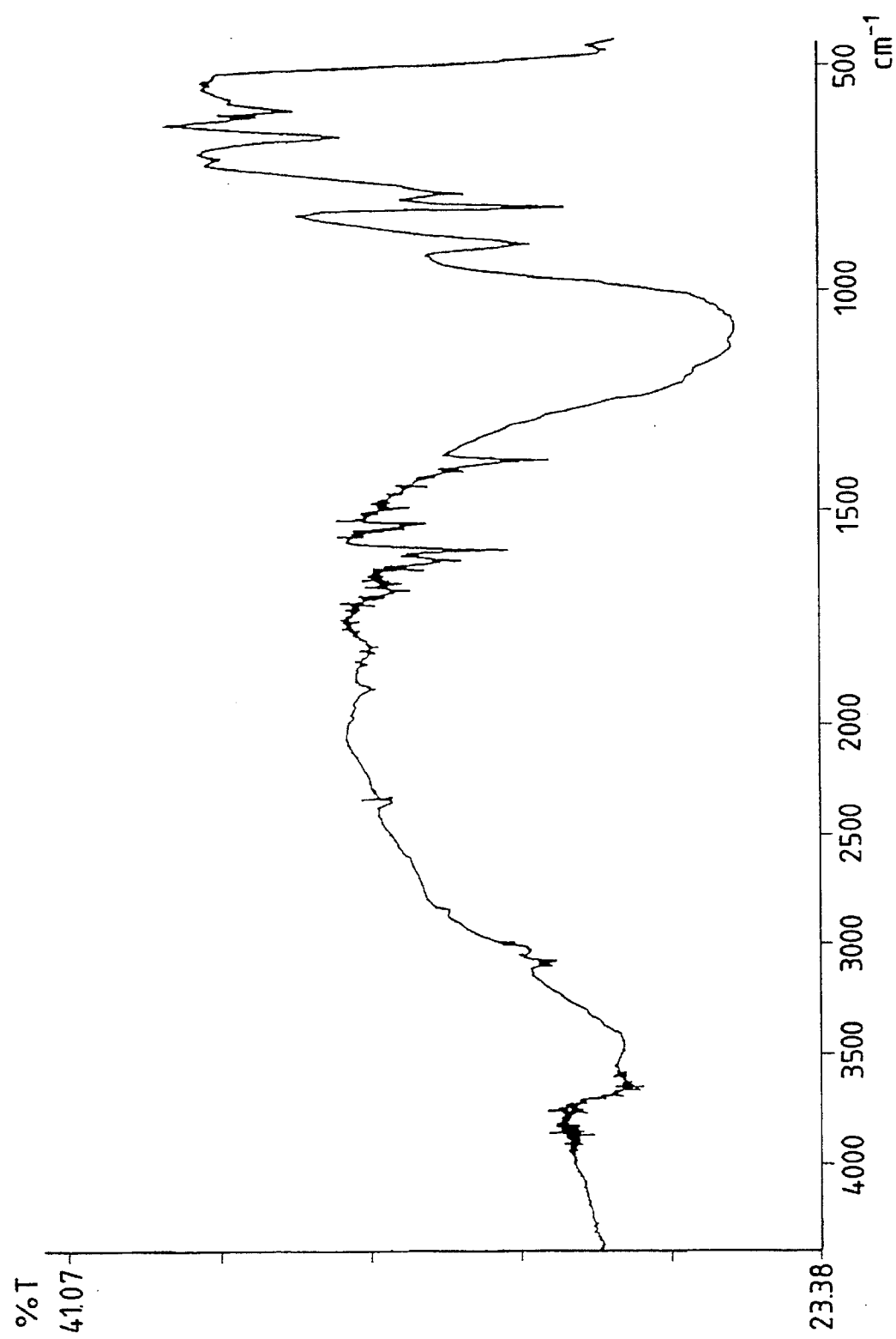
FIG. 4 is an FT-IR chart of styryl group-containing organopolysiloxane particles obtained in Example 7.

The particulate product was subjected to measurement of FT-IR. The resultant chart is shown in FIG. 4, revealing that the existence of the styryl group was confirmed through the peaks based on the C=C stretching vibrations at 1,603 cm$^{-1}$ and the out-of-plane vibrations of C—H of the substituted benzene at 678 cm$^{-1}$.

The existence of the styryl group was also confirmed by the color reaction according to the potassium permanganate method where the purple solution was bleached.

Further, the results of the quantitative analysis of ≡Si—OH group revealed that its content was 24.2 mg equivalents/g. The results of microanalysis revealed that the carbon content was 41.9 wt %. From these data, it was confirmed that the styryl group-containing organopolysiloxane product had an average compositional formula

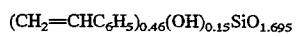

EXAMPLE 8

The general procedure of Example 1 was repeated using 37.3 g (150 mmols) of γ-methacryloxypropyltrimethoxysilane instead of γ-glycidoxypropyltrimethoxysilane. One minute after the dropping, the reaction solution was changed into a white gel, followed by treatment in the same manner as in Example 1, thereby obtaining 28.7 g of an organopolysiloxane particulate product at a yield of 80%. The product was porous as having a bulk specific gravity of 0.44 g/cm$^3$ and a specific surface area of 386 m$^2$/g.

Figure 5:
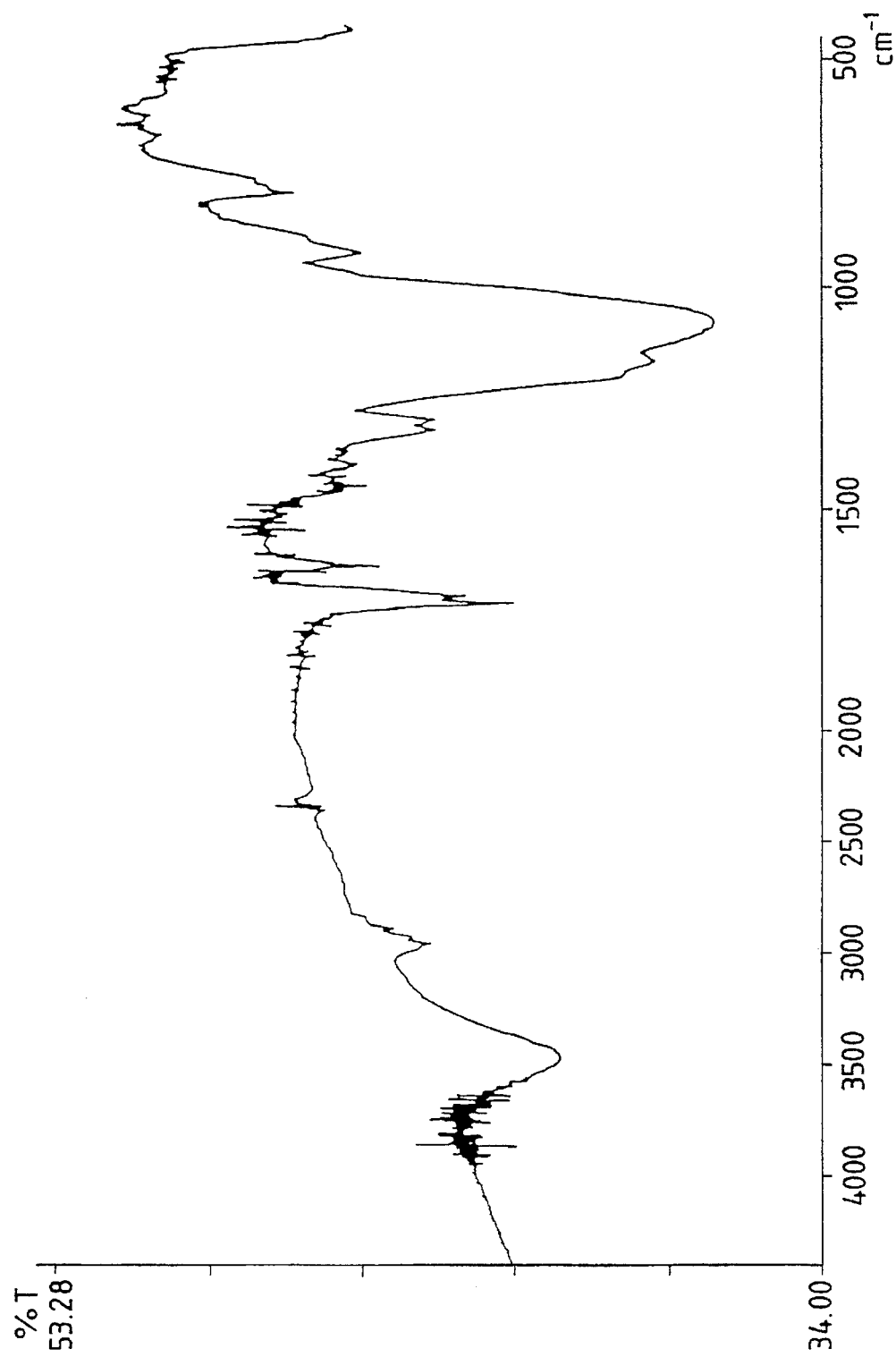
FIG. 5 is an FT-IR chart of γ-methacryloxypropyl group-containing organopolysiloxane particles obtained in Example 8.

The particulate product was subjected to measurement of FT-IR. The resultant chart is shown in FIG. 5, revealing that the existence of the γ-methacryloxypropyl group was confirmed through observation of the peak based on the C=O stretching vibrations at 1,718 cm$^{-1}$ and also through the color reaction using the potassium permanganate method wherein the purple solution was bleached.

Further, the results of the quantitative analysis of ≡Si—OH group revealed that its content was 16.5 mg equivalents/g. The results of microanalysis revealed that the carbon content was 32.6 wt %. From these data, it was confirmed that the γ-methacryloxypropyl group-containing organopolysiloxane product had an average compositional formula

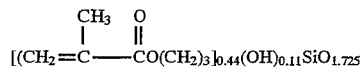

$[(CH_2=C—CO(CH_2)_3]_{0.44}(OH)_{0.11}SiO_{1.725}$

EXAMPLE 9

The general procedure of Example 1 was repeated using 26.9 g (150 mmols) of aminopropyltrimethoxysilane instead of γ-glycidoxypropyltrimethoxysilane. Immediately after the dropping, the reaction solution was changed into a white gel, followed by treatment in the same manner as in Example 1, thereby obtaining 20.4 g of an organopolysiloxane particulate product at a yield of 80%. The product was porous as having a bulk specific gravity of 0.5 g/cm$^3$ and a specific surface area of 410 m$^2$/g.

The particulate product was subjected to the Rimini test against the primary amine (Jikken Kagaku Kouza, fifth series, Method for Quantitative Confirmation of Organic Compounds, p. 1044, published by Maruzen Co., Ltd.) wherein a purplish red color was assumed, thereby giving evidence of the existence of the amino group. Further, the results of the quantitative analysis of ≡Si—OH group revealed that its content was 40.3 mg equivalents/g. The results of microanalysis revealed that the carbon content was 19.2 wt %. From these data, it was confirmed that the amino group-containing organopolysiloxane product had an average compositional formula $[H_2N(CH_2)_3]_{0.45}(OH)_{0.20}SiO_{1.675}$

EXAMPLE 10

The general procedure of Example 1 was repeated using 29.5 g (150 mmols) of mercaptopropyltrimethoxysilane instead of γ-glycidoxypropyltrimethoxysilane. Immediately after the dropping, the reaction solution was changed into a white gel, followed by treatment in the same manner as in Example 1, thereby obtaining 25.8 g of an organopolysiloxane particulate product at a yield of 82%. The product was porous as having a bulk specific gravity of 0.37 g/cm$^3$ and a specific surface area of 520 m$^2$/g.

The particulate product was subjected to the color reaction according to the sodium nitroprusside method (Jikken Kagaku Kouza, fifth series, Method for Quantitative Confirmation of Organic Compounds, p. 1170, published by Maruzen Co., Ltd.) wherein a purplish red color was assumed, thereby giving evidence of the existence of the mercapto group. Further, the results of the quantitative analysis of ≡Si—OH group revealed that its content was 32.6 mg equivalents/g. The results of microanalysis revealed that the carbon content was 18.4 wt %. From these data, it was confirmed that the amino group-containing organopolysiloxane product had an average compositional formula $[HS(CH_2)_3]_{0.48}(OH)_{0.18}SiO_{1.67}$

EXAMPLE 11

100 g (424 mmols) of γ-glycidoxypropyltrimethoxysilane and 100 g of methanol (3.12 mols) were charged into a 500 ml reactor equipped with an agitator, a thermometer and a condenser and mixed under agitation. 0.5 g (9 mmols) of KF dissolved in 45.8 g (2.54 mols) of water was dropped in 3 minutes at room temperature. After completion of the dropping, the inner temperature was raised to 44° C., under which the reaction solution was agitated at room temperature for 2 hours. Thereafter, 8.8 g (84 mmols) of trimethylmethoxysilane was dropped in one minute, followed by agitation for further 2 hours. Subsequently, the reactor was attached with an ester adapter, followed by addition of 200 g of toluene and distilling off the resultant methanol while heating. After cooling of the reaction solution, it was allowed to separate into an aqueous phase and an organic phase. The organic phase was washed with water three times. Glauber's salt was added to the thus washed organic phase to remove moisture therefrom, followed by elimination of the toluene by means of an evaporator to obtain 75.8 g of a transparent viscous liquid.

The transparent viscous liquid has a viscosity of 1316.8 cps., a refractive index of 1.4669 at 25° C. and an epoxy equivalent of 153.

Figure 7:
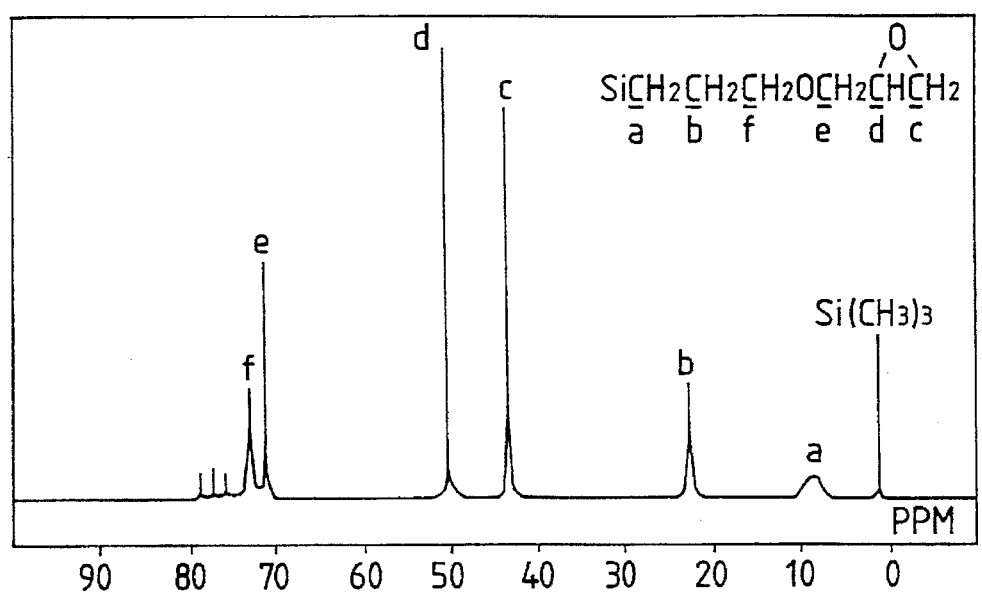
FIG. 7 is a $^{13}$C-NMR spectrum chart of an epoxy group-containing organopolysiloxane obtained in Example 11.

The liquid substance was subjected to measurement of $^{13}$C-NMR, with the results shown in FIG. 7. The comparison between the spectra of γ-glycidoxypropyltrimethoxysilane and the spectra of the liquid substance reveals an apparent difference therebetween. Since the peak is found at a δ value of 1.021 ppm, the substance is confirmed as trimethylsilylated. In addition, any peak which is derived from the methoxy group and would have had to be observed at a δ value of 50.361 ppm is not observed at all, thus the methoxy group completely disappearing. Moreover, the peaks derived form the epoxy group are found at δ values of 43.20 ppm and 50.040 ppm and any fresh peak which derived from groups other than those in the starting epoxysilane appears. Thus, it will be seen that the epoxy group is contained as being not impeded.

Figure 8:
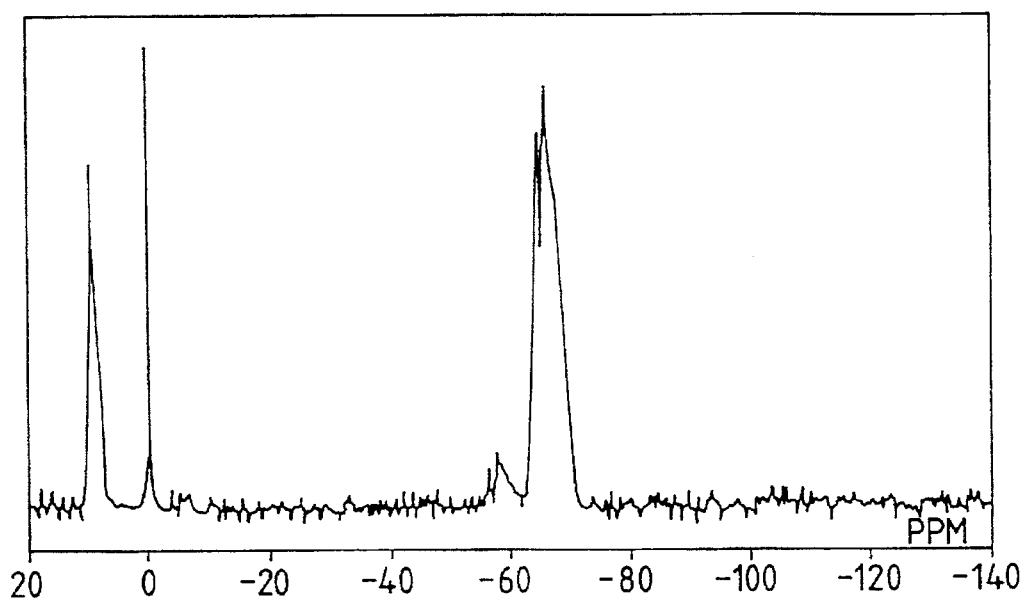
FIG. 8 is a $^{29}$Si-NMR spectrum chart of an epoxy group-containing organopolysiloxane obtained in Example 11.

The results of measurement of $^{29}$Si-NMR are shown in FIG. 8. From the results, the molar ratios of the individual units are as follows.

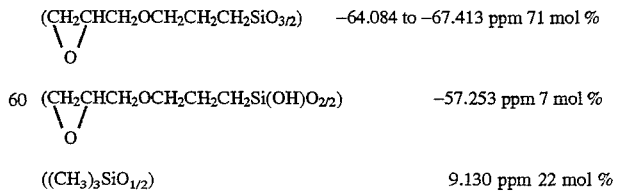

| | |
|---|---|
| (CH$_2$CHCH$_2$OCH$_2$CH$_2$CH$_2$SiO$_{3/2}$)<br>\\ /<br>O | −64.084 to −67.413 ppm 71 mol % |
| (CH$_2$CHCH$_2$OCH$_2$CH$_2$CH$_2$Si(OH)O$_{2/2}$)<br>\\ /<br>O | −57.253 ppm 7 mol % |
| ((CH$_3$)$_3$SiO$_{1/2}$) | 9.130 ppm 22 mol % |

From these results, the substance is found to be an epoxy group-containing liquid organopolysiloxane having the following compositional formula.

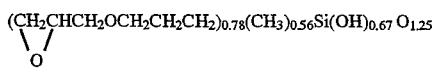

EXAMPLE 12

100 g (424 mmols) of γ-glycidoxypropyltrimethoxysilane, 8.8 g (84 mmols) of trimethylmethoxysilane and 100 g of methanol (3.12 mols) were charged into a 500 ml reactor equipped with an agitator, a thermometer and a condenser and mixed under agitation. 0.5 g (9 mmols) of KF dissolved in 45.8 g (2.54 mols) of water was dropped in 3 minutes at room temperature. After completion of the dropping, the inner temperature was raised to 43° C., under which the reaction solution was agitated at room temperature for 2 hours. Subsequently, the reactor was attached with an ester adapter, followed by addition of 200 g of toluene and distilling off the resultant methanol while heating. After cooling of the reaction solution, the solution was allowed to separate into an aqueous phase and an organic phase. The organic phase was washed with water three times. Glauber's salt was added to the thus washed organic phase to remove moisture therefrom, followed by elimination of the toluene by means of an evaporator to obtain 81.0 g of a transparent viscous liquid.

The transparent viscous liquid had a viscosity of 826.0 cps. (25° C.), a refractive index of 1.4634 (25° C.) and an epoxy equivalent of 143.

In the same manner as in Example 11, the liquid substance was subjected to measurement of $^{29}$Si-NMR, from which the molar ratios of the individual units were as follows.

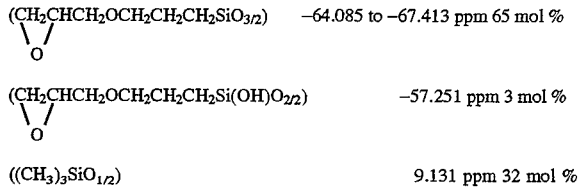

From these results, the substance is found to be an epoxy group-containing liquid organopolysiloxane having the following compositional formula

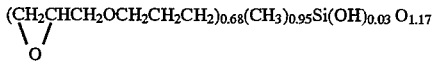

EXAMPLE 13

0.5 g (9 mmols) of KF, 45.8 g (2.54 mols) of water and 100 g (3.12 mols) of methanol were placed in a 500 ml reactor equipped with an agitator, a thermometer and a condenser and mixed under agitation. 100 g (424 mmols) of γ-glycidoxypropyltrimethoxysilane was dropped in the mixture in 8 minutes. After completion of the dropping, the reaction system was raised to 36° C., under which it was agitated at room temperature for further 2 hours, followed by further dropping of 8.8 g (84 mmols) of trimethylmethoxysilane in one minute and agitation for further 2 hours. Thereafter, the solution was treated in the same manner as in Example 11 to obtain 76.0 g of a transparent viscous liquid.

The transparent viscous liquid had a viscosity of 1103.2 cps. (25° C.), a refractive index of 1.4653 (25° C.) and an epoxy equivalent of 153.

In the same manner as in Example 11, the liquid substance was subjected to measurement of $^{29}$Si-NMR, from which the molar ratios of the individual units were as follows.

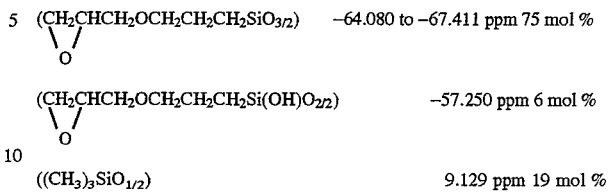

From these results, the substance is found to be an epoxy group-containing liquid organopolysiloxane having the following compositional formula.

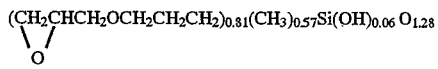

EXAMPLE 14

The general procedure of Example 11 was repeated except that 27 g (1.5 mmols) of $(NH_4)_2SiF_6$ was used instead of 0.5 g (9 mmols) of KF, thereby obtaining 76.3 g of a transparent liquid substance.

The liquid substance had a viscosity of 1103.2 cps. (25° C.), a refractive index of 1.4653 (25° C.) and an epoxy equivalent of 153.

In the same manner as in Example 11, the liquid substance was subjected to measurement of $^{29}$Si-NMR, from which the molar ratios of the individual units were as follows.

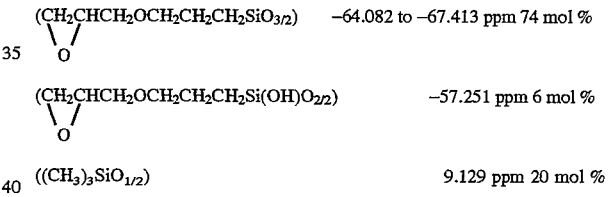

From these results, the substance is found to be an epoxy group-containing liquid organopolysiloxane having the following compositional formula.

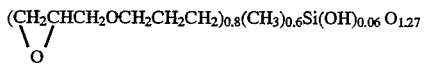

EXAMPLE 15

100 g (424 mmols) of γ-glycidoxypropyltrimethoxysilane, 1.64 g (9 mmols) of fluorotriethoxysilane and 100 g (3.12 mols) of methanol were charged into a 500 ml reactor equipped with an agitator, a thermometer and a condenser and mixed under agitation. 0.5 g (9 mmols) of KF dissolved in 45.8 g (2.54 mols) of water was dropped in 3 minutes at room temperature. After completion of the dropping, the inner temperature was raised to 38° C., under which the reaction solution was agitated at room temperature for 2 hours, followed by dropping of 8.8 g (84 mmols) of trimethylmethoxysilane in one minute and further agitation for 2 hours. Thereafter, the procedure of Example 11 was repeated, thereby obtaining 75.8 g of a transparent liquid substance.

The liquid substance had a viscosity of 138.25 cps. (25° C.), a refractive index of 1.4501 (25° C.) and an epoxy equivalent of 152.

In the same manner as in Example 11, the liquid substance as subjected to measurement of $^{29}$Si-NMR, from which the molar ratios of the individual units were as follows.

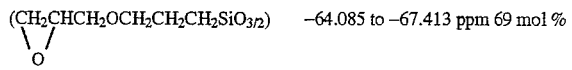  −64.085 to −67.413 ppm 69 mol%

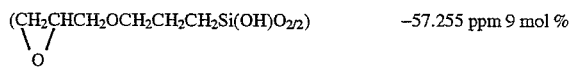  −57.255 ppm 9 mol%

$((CH_3)_3SiO_{1/2})$  9.130 ppm 22 mol%

From these results, the substance is found to be an epoxy group-containing liquid organopolysiloxane having the following compositional formula.

EXAMPLE 16

63.7 g (270 mmols) of γ-glycidoxypropyltrimethoxysilane, 35.7 g (180 mmols) of phenyltriethoxysilane and 100 g (3.12 mols) of methanol were charged into a 500 ml reactor equipped with an agitator, a thermometer and a condenser and mixed under agitation. 0.5 g (9 mmols) of KF dissolved in 48.6 g (2.70 mols) of water was dropped in 3 minutes at room temperature. After completion of the dropping, the inner temperature was raised to 47° C., under which the reaction solution was agitated at room temperature for 2 hours, followed by dropping of 9.4 g (90 mmols) of trimethylmethoxysilane in one minute and further agitation for 2 hours. Thereafter, the procedure of Example 11 was repeated, thereby obtaining 61.7 g of a transparent liquid substance.

The liquid substance had a viscosity of 6771.1 cps. (25° C.), a refractive index of 1.4958 (25° C.) and an epoxy equivalent of 140.

In the same manner as in Example 11, the liquid substance as subjected to measurement of $^{29}$Si-NMR, from which the molar ratios of the individual units were as follows.

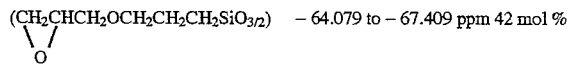  − 64.079 to − 67.409 ppm 42 mol%

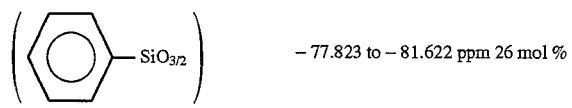  − 77.823 to − 81.622 ppm 26 mol%

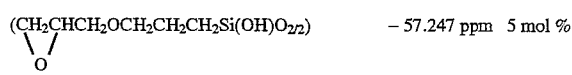  − 57.247 ppm 5 mol%

  − 69.781 ppm 8 mol%

  9.128 ppm 19 mol%

From these results, the substance is found to be an epoxy group-containing liquid organopolysiloxane having the following compositional formula.

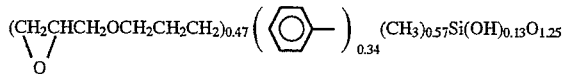

EXAMPLE 17

33.0 g (140 mmols) of γ-glycidoxypropyltrimethoxysilane, 65.4 g (330 mmols) of phenyltriethoxysilane and 100 g (3.12 mols) of methanol were charged into a 500 ml reactor equipped with an agitator, a thermometer and a condenser and mixed under agitation. 0.5 g (9 mmols) of KF dissolved in 50.8 g (2.82 mols) of water was dropped in 3 minutes at room temperature. After completion of the dropping, the inner temperature was raised to 46° C., under which the reaction solution was agitated at room temperature for 2 hours, followed by dropping of 9.4 g (90 mmols) of trimethylmethoxysilane in one minute and further agitation for 2 hours. Thereafter, the procedure of Example 11 was repeated, thereby obtaining 76.3 g of a transparent liquid substance.

The liquid substance had a viscosity of 18677.5 cps. (25° C.), a refractive index of 1.5206 (25° C.) and an epoxy equivalent of 131.

In the same manner as in Example 11, the liquid substance as subjected to measurement of $^{29}$Si-NMR, from which the molar ratios of the individual units were as follows.

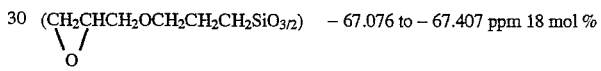  − 67.076 to − 67.407 ppm 18 mol%

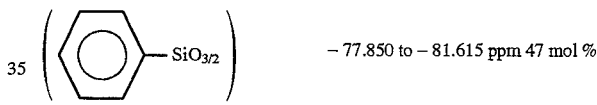  − 77.850 to − 81.615 ppm 47 mol%

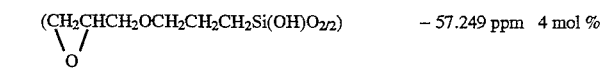  − 57.249 ppm 4 mol%

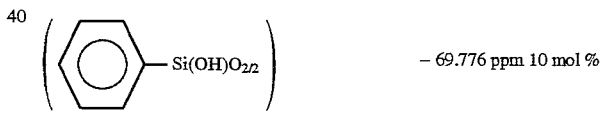  − 69.776 ppm 10 mol%

$((CH_3)_3SiO_{1/2})$  9.127 ppm 21 mol%

From these results, the substance is found to be an epoxy group-containing liquid organopolysiloxane having the following compositional formula.

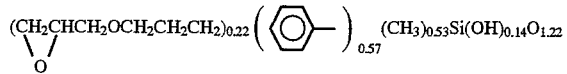

EXAMPLE 18

The general procedure of Example 11 was repeated except that 7.6 g (424 mmols) of water was used, thereby obtaining 85.2 g of a transparent liquid substance.

The substance had a viscosity of 972 cps. (25° C.), a refractive index of 1.4651 (25° C.) and an epoxy equivalent of 159.

In the same manner as in Example 11, the liquid substance as subjected to measurement of $^{29}$Si-NMR, from which the molar ratios of the individual units were as follows.

(CH$_2$CHCH$_2$OCH$_2$CH$_2$CH$_2$SiO$_{3/2}$)  −64.054 to −67.301 ppm 53 mol %
  \O/

(CH$_2$CHCH$_2$OCH$_2$CH$_2$CH$_2$Si(OCH$_3$)O$_{2/2}$)  −59.896 ppm 24 mol %
  \O/

(CH$_2$CHCH$_2$OCH$_2$CH$_2$CH$_2$Si(OH)O$_{2/2}$)  −57.896 ppm 4 mol %
  \O/

((CH$_3$)$_3$SiO$_{1/2}$)  9.106 ppm 19 mol %

From these results, the substance is found to be an epoxy group-containing liquid organoppolysiloxane having the following compositional formula.

(CH$_2$CHCH$_2$OCH$_2$CH$_2$CH$_2$)$_{0.31}$(CH$_3$)$_{0.57}$(OCH$_3$)$_{0.24}$Si(OH)$_{0.04}$O$_{1.17}$
  \O/

COMPARATIVE EXAMPLE 2

100 g (424 mmols) of γ-glycidoxypropyltrimethoxysilane and 100 g (3.12 mols) of methanol were charged into a 500 ml reactor equipped with an agitator, a thermometer and a condenser and mixed under agitation. 45.8 g of a 5% NH$_3$ aqueous solution was dropped in the solution at room temperature in 3 minutes. After completion of the dropping, the inner temperature was raised to 33° C., under which the reaction solution was agitated for 2 hours at room temperature. Thereafter, 8.8 g (84 mmols) of trimethylmethoxysilane was dropped in the solution in one minute, followed by further agitation for 2 hours. The reactor was attached with an ester adapter and 200 g of toluene was added to the reaction solution, followed by heating to distill off the resultant methanol, during which the solution was changed into a gel because of the ring opening of the epoxy ring.

COMPARATIVE EXAMPLE 3

The general procedure of Comparative Example 2 was repeated except that 45.8 g of a 5% hydrochloric acid aqueous solution was used instead of the 5% NH$_3$ aqueous solution. Thereafter, the ester adapter was attached to the reactor, to which 200 g of toluene was added. The resultant methanol was distilled off while heating, during which the solution was gelled because of the ring-opening of the epoxy ring.

COMPARATIVE EXAMPLE 4

The general procedure of Comparative Example 2 was repeated except that 45.8 g of a 0.65% hydrochloric acid aqueous solution was used instead of the 5% NH$_3$ aqueous solution. Thereafter, the solution was treated in the same manner as in Example 11 to obtain 48 g of a transparent viscous liquid. The liquid had a viscosity of 223.1 cps. (25° C.) and a refractive index of 1.4450 (25° C.).

Figure 9:
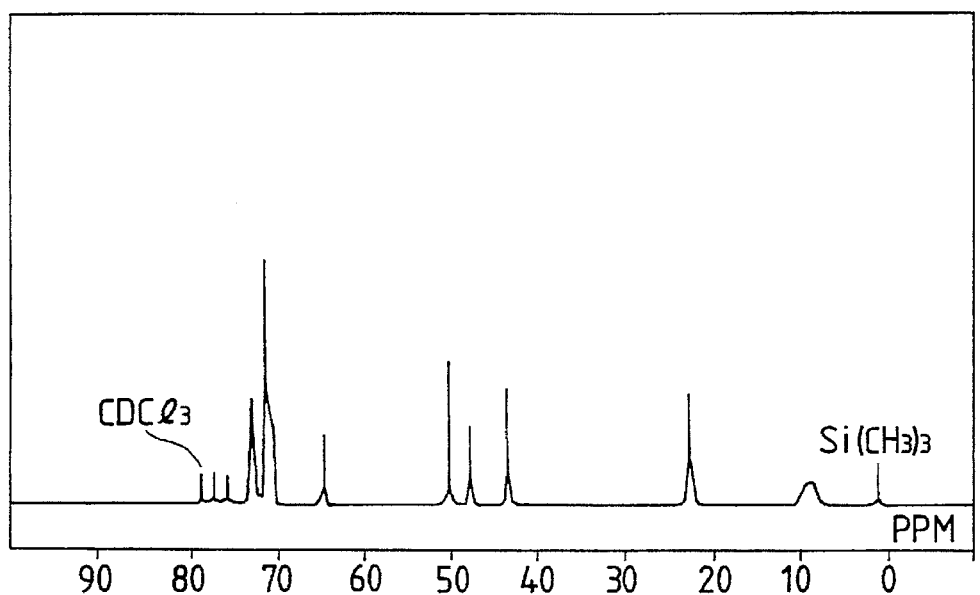
FIG. 9 is a $^{13}$C-NMR spectrum chart of an epoxy group-containing organopolysiloxane obtained in Comparative Example 4.

The liquid was subjected to measurement of $^{13}$C-NMR. The results are shown in FIG. 9, revealing that the peaks derived from the methoxy group at a δ value of 47.332 ppm and the hydrolysis was incomplete. Moreover, the peaks derived from the epoxy group at δ values of 43.195 ppm and 71.056 ppm were reduced in height and peaks which were not found for the starting γ-glycidoxypropyltrimethoxysilane appeared, giving evidence that the epoxy group was damaged.

COMPARATIVE EXAMPLE 5

The general procedure of Comparative Example 2 was repeated except that 45.8 g of an ammonia aqueous solution was used instead of the 5% NH$_3$ aqueous solution, followed by the same treatment as in Example 11 to obtain 68 g of a transparent viscous liquid substance. The liquid had a viscosity of 452.7 cps. (25° C.) and a refractive index of 1.4742 (25° C.).

Figure 10:
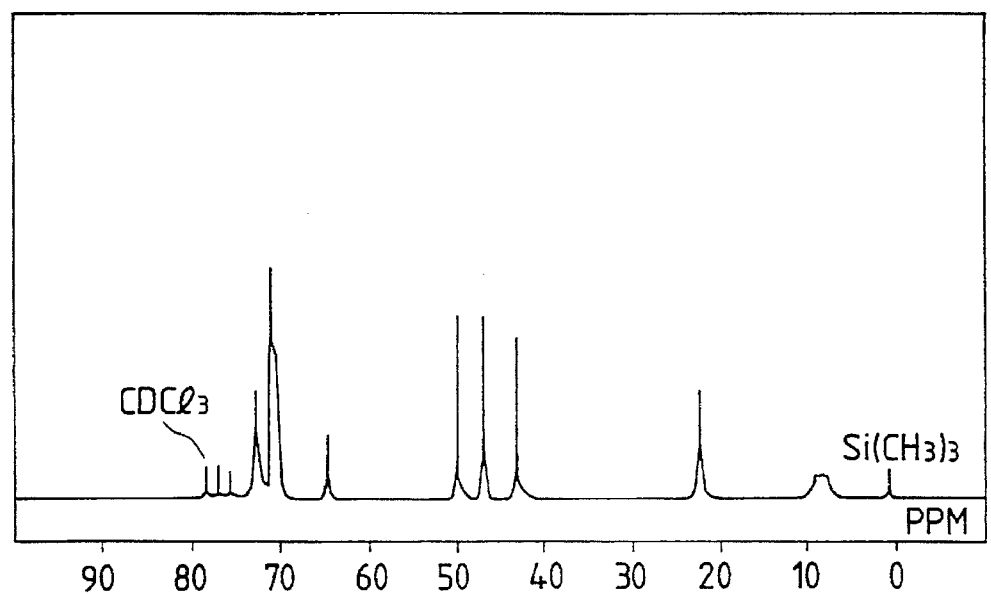
FIG. 10 is $^{13}$C-NMR spectrum chart of an epoxy group-containing organopolysiloxane obtained in Comparative Example 5.
Figure 11:
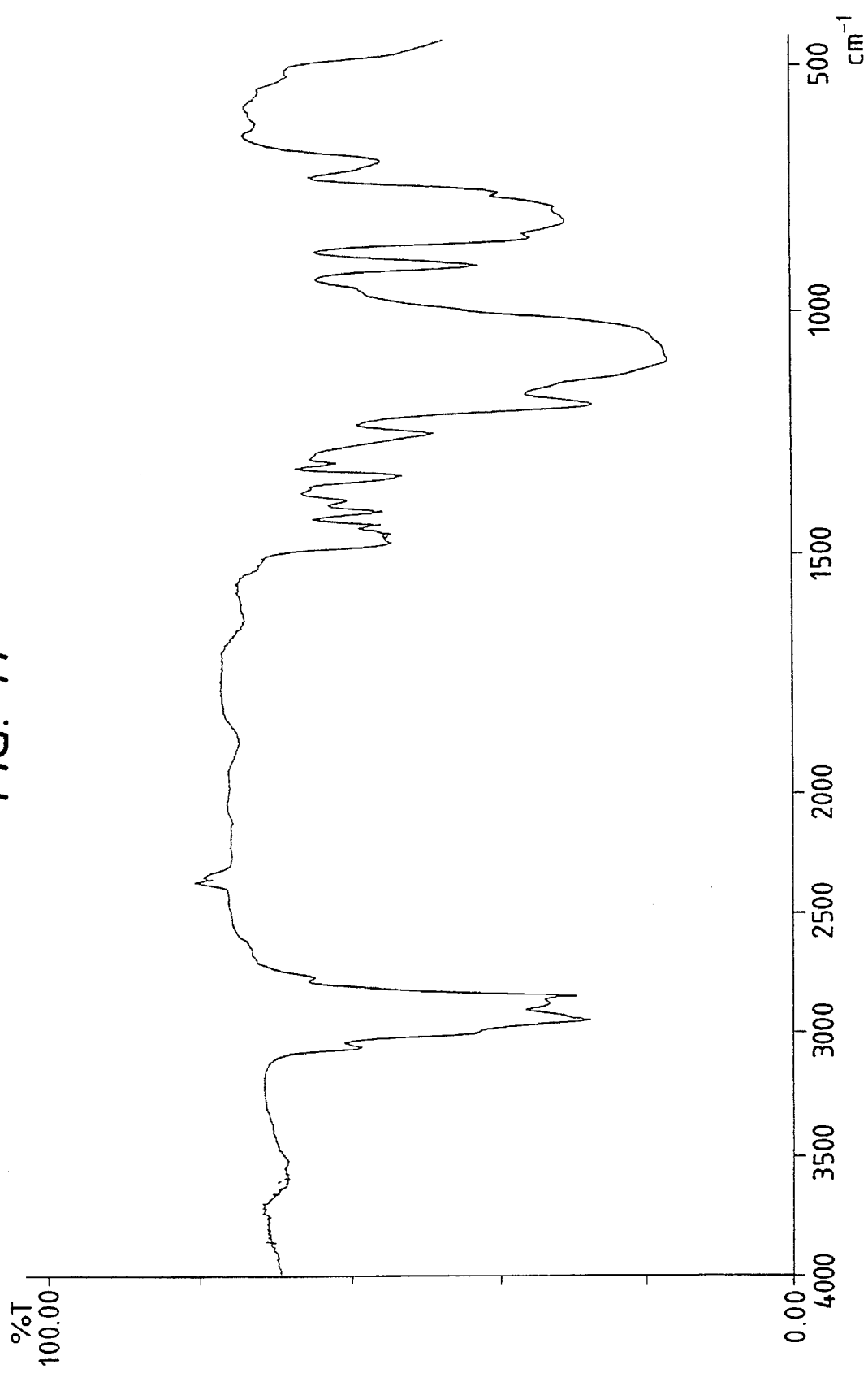
FIG. 11 is an IR absorption spectrum chart of an epoxy group-containing oligomer obtained in Example 19.
Figure 12:
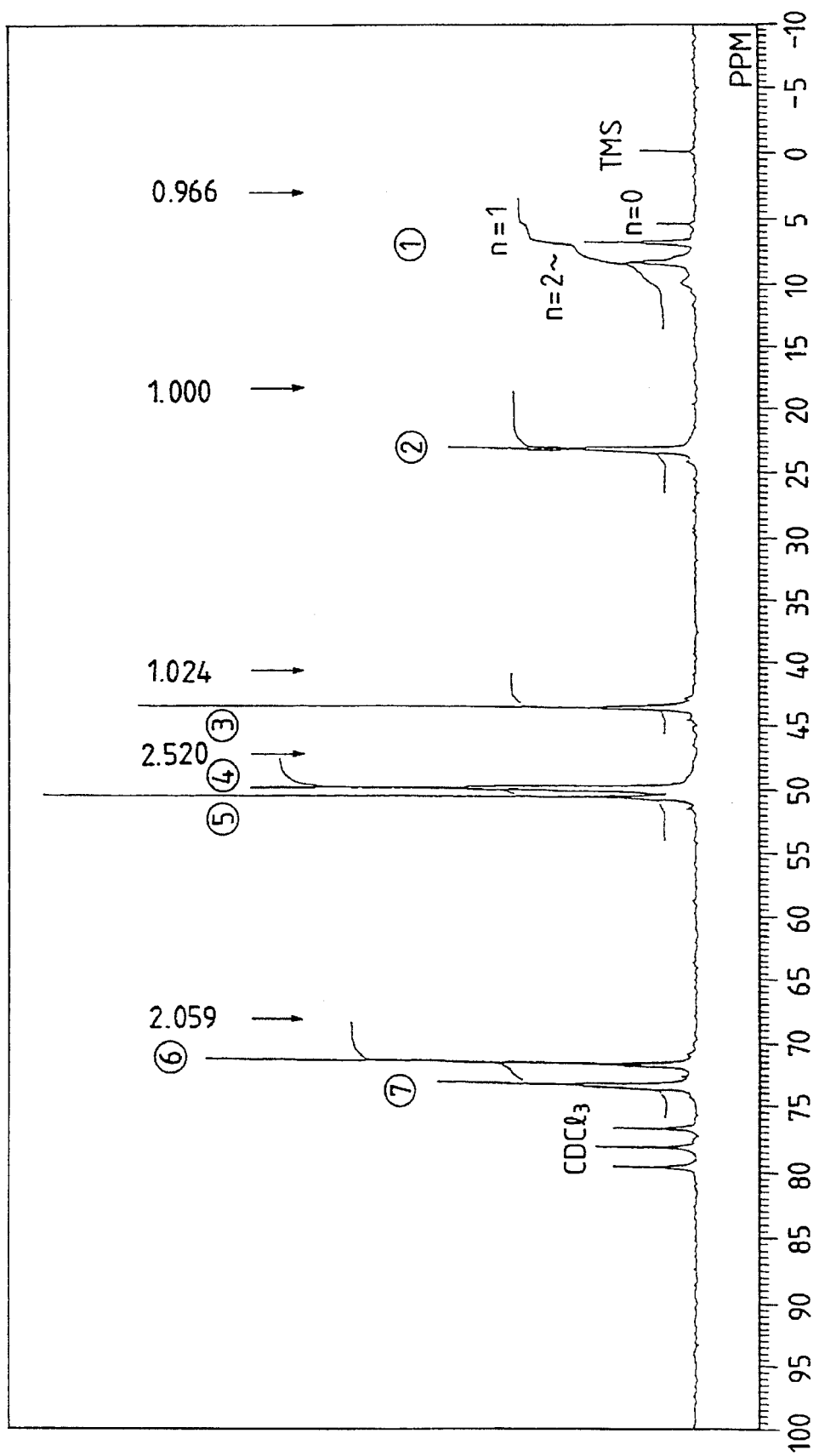
FIG. 12 is a $^{13}$C-NMR spectrum chart of an epoxy group-containing oligomer obtained in Example 19.
Figure 13:
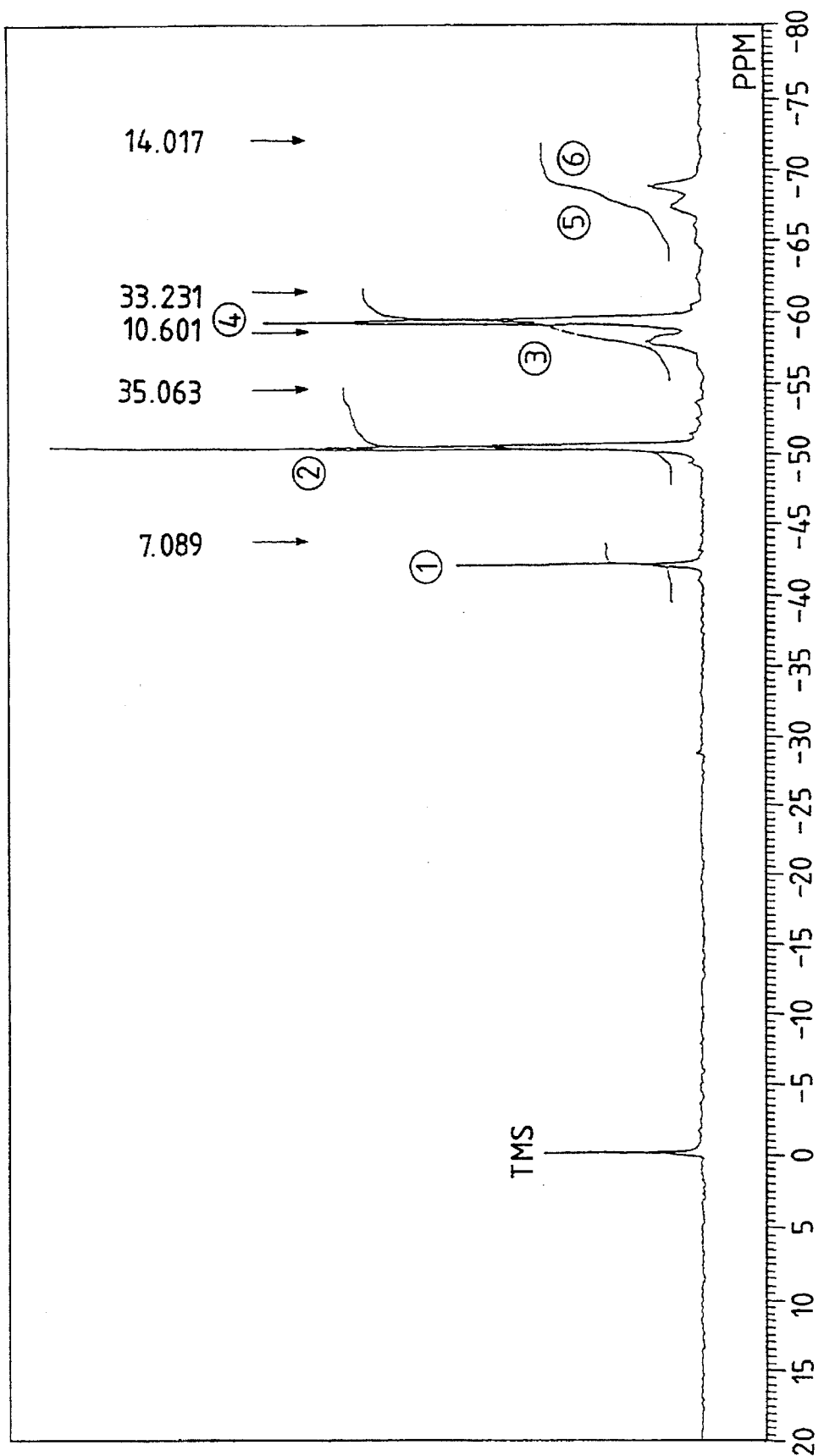
FIG. 13 is a $^{29}$Si-NMR spectrum chart of an epoxy group-containing oligomer obtained in Example 19.
Figure 14:
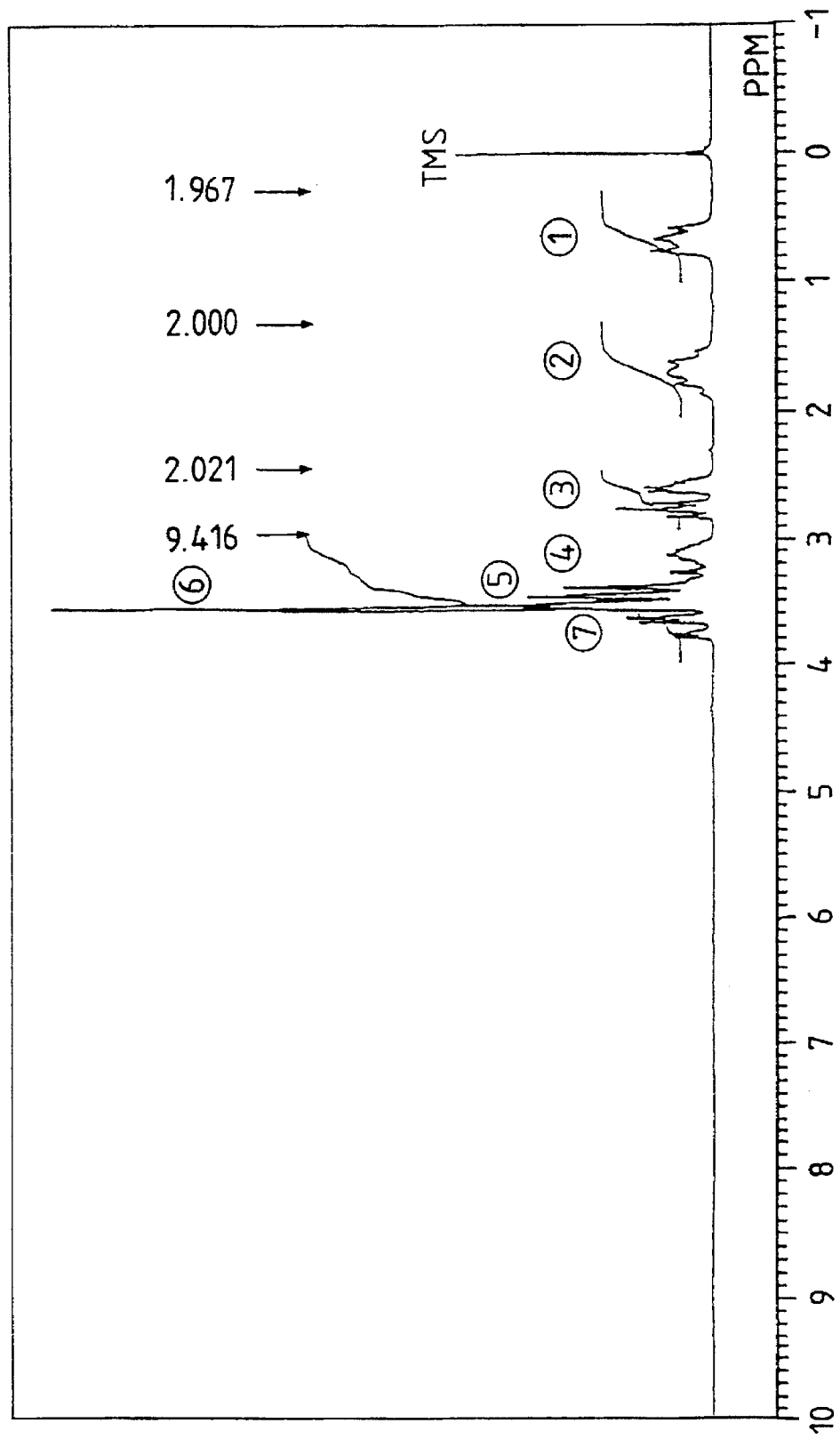
FIG. 14 is a $^1$H-NMR spectrum chart of an epoxy group-containing oligomer obtained in Example 19.

The results of measurement of $^{13}$C-NMR of the substance are shown in FIG. 10, revealing that the peak derived from the methoxy group at a δ value of 47.453 ppm was observed, from which the hydrolysis was incomplete. Moreover, the peaks derived from the epoxy group at δ values of 43.206 ppm and 50.096 ppm were reduced in height and peaks which were not found for the starting γ-glycidoxypropyltrimethoxysilane appeared at a values of 64.532 ppm and 70.996 ppm, giving evidence that the epoxy group was damaged.

EXAMPLE 19

236.3 g (1.00 mol) of γ-glycidoxypropyltrimethoxysilane and 100 g of methanol were charged into a 500 ml reactor equipped with an agitator, a thermometer and a condenser and mixed under agitation. A solution of 0.58 g (0.01 mol) of KF, 14.4 g (0.80 mols) of water and 100 g of methanol was dropped in the mixture in 10 minutes at room temperature. The temperature of the solution which was 26° C. prior to the dropping was raised to 38° C. After completion of the dropping, the reaction solution was agitated at room temperature for 2 hours and was immediately subjected to analysis of $^{13}$C-NMR, revealing that any alcoholic carbon other than those peaks derived from the methanol and γ-glycidoxypropyltrimethoxysilane was not recognized. From this, it was confirmed that the epoxy ring was not ring-opened at all.

The liquid was subjected to analysis of $^{29}$Si-NMR, from which it was found that the silane moiety was hydrolyzed and condensed and an oligomer having the following units was formed

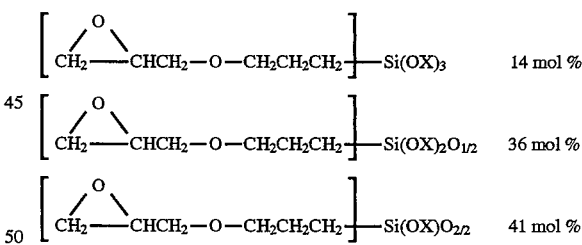

In the above formulas, X represents a hydrogen atom or a methyl group.

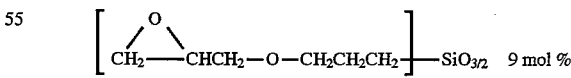

From the above results, 91 wt % of the water added for the hydrolysis was changed into siloxane bonds. This reveals that the hydrolysis and polycondensation reactions proceed very rapidly.

The reactor containing the reaction solution was heated to distill off the resultant methanol. After cooling, the reaction solution was filtered to remove the salt used as the catalyst therefrom to obtain 189.5 g of a lightly yellow transparent liquid at a yield of 95.0%. The thus obtained liquid had a viscosity of 60.7 cps (25° C.) and a specific gravity of 1.164 (25° C.), a refractive index of 1.4544 (25° C.) and an epoxy equivalent of 200.8 (g/mol, theoretical: 199.2)

From the above results, the liquid was confirmed to be a partially hydrolyzed oligomer of γ-glycidoxypropyltrimethoxysilane and had an average composition of the following formula as expected from the starting composition

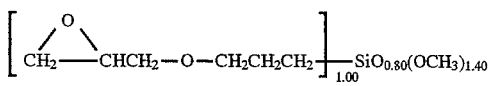

The liquid was subjected to analyses of IR absorption spectrum, $^{13}$C-NMR, $^{29}$Si-NMR and $^{1}$H-NMR, the results of which are, respectively, shown in FIGS. 11, 12, 13 and 14. From the results, it was confirmed that no ring-opening of the epoxy group took place.

IR Spectra

Absorptions of the epoxy group: 1254 cm$^{-1}$, 910 cm$^{-1}$, 820 cm$^{-1}$

Absorption of the Si—O—Si group: 1104 cm$^{-1}$

Absorptions of the Si—OCH$_3$ group: 2841 cm$^{-1}$, 1198 cm$^{-1}$, 1104 cm$^{-1}$ The results of the analyses of the $^{13}$C-NMR spectra are shown in Table 1 below.

TABLE 1

| Chemical Shift δ [ppm] | Structure of Carbon | Integral Relative Ratio [C] |
|---|---|---|
| 73.48 to 71.81 | 6, 7 | 2.06 |
| 50.81 to 50.12 | 4, 6 | 2.52 |
| 43.77 | 3 | 1.02 |
| 23.30 | 2 | 1.00 |
| 9.91 to 5.49 | 1 | 0.97 |

In Table 1, the FIGS. 1 to 7 at "Structure of Carbon", respectively, correspond to the carbon atoms in the following formula

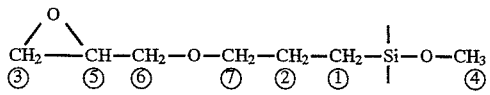

The results of the analyses of the $^{29}$Si-NMR spectra are shown in Table 2 below.

TABLE 2

| Chemical Shift δ[ppm] | Structure of Si | Integral Ratio [mole %] |
|---|---|---|
| −41.95 | (CH$_3$O)$_3$Si-R monomer | 7.1 |
| −50.18 to −50.32 | R<br>\|<br>(CH$_3$O)$_2$Si—O—Si≡ end of polymer or dimer | 35.1 |
| −57.94 to −59.24 | R<br>\|<br>≡Si—O—Si—O—Si≡ chain portion in polymer<br>\|<br>OCH$_3$ | 43.8 |

TABLE 2-continued

| Chemical Shift δ[ppm] | Structure of Si | Integral Ratio [mole %] |
|---|---|---|
| −68.75 | R<br>\|<br>≡Si—O—Si—O—Si≡ cross-linked<br>\|<br>OSi≡ portion | 14.0 |

The results of Table 2 reveal that the reaction product was represented by the following average compositional formula and was coincident with the intended compound represented by the above formula as confirmed.

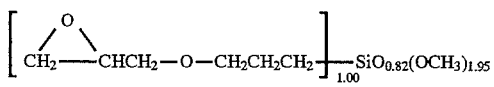

In addition, it is also revealed that the water used for the hydrolysis was fully consumed and the condensation reaction was completed.

The results of the analyses of the $^{1}$H-NMR spectra are shown in Table 3 below.

TABLE 3

| Chemical Shift δ [ppm] | Structure of Hydrogen | Spectral Form | Integral Ratio [H] |
|---|---|---|---|
| 3.71 | 7 | double-d | 9.42 |
| 3.55 | 6 | s | 9.42 |
| 3.43 | 5 | m | 9.42 |
| 3.11 | 4 | m | 9.42 |
| 2.54 to 2.82 | 3 | m | 2.02 |
| 1.54 to 1.79 | 2 | m | 2.00 |
| 0.58 to 0.76 | 1 | m | 1.97 |

The figures in the "Structure of Hydrogen" have, respectively, correspond to those attached to carbon atoms in the following formula.

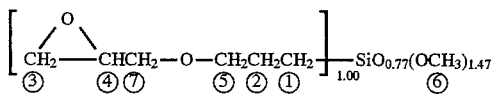

EXAMPLE 20

The general procedure of Example 19 was repeated except that 8.0 g (0.44 mols) of water was used, thereby obtaining 200.5 g of a colorless transparent liquid at a yield of 94.1%. The thus obtained liquid had a viscosity of 14.2 cps. (25° C.), a specific gravity of 1.126 (25° C.), a refractive index of 1.4434 (25° C.) and an epoxy equivalent of 214.1 (g/mol, theoretical: 213.3) and had the following average composition

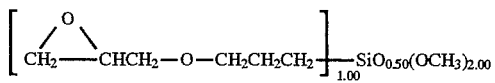

The above structure was supported by the results of the analyses of IR absorption spectra, $^{1}$H-NMR spectra and $^{29}$Si-NMR spectra.

EXAMPLE 21

The general procedure of Example 19 was repeated except that the alkoxysilane used was changed to a mixture of 118.2 g (0.50 mols) of γ-glycidoxypropyltrimethoxysilane and 99.0 g (0.50 mols) of phenyltrimethoxysilane and that 5.0 ml (0.005 mols) of tetrabutylammonium fluoride (as a 1.0M tetrahydrofuran (THF) solution, was used as a catalyst, thereby obtaining 172.3 g of a light yellow transparent liquid at a yield of 95.5%. The liquid was found to have the following average composition formula and had a viscosity of 59.2 cps. (25° C.), a specific gravity of 1.174 (25° C.), a refractive index of 1.4846 (25° C.) and an epoxy equivalent of 362.1 (g/mol, theoretical: 360.8)

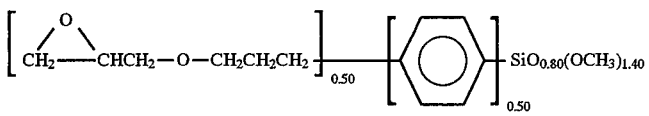

The above structure was supported by the results of the analyses of IR absorption spectra, $^1$H-NMR spectra and $^{29}$Si-NMR spectra.

EXAMPLE 22

The general procedure of Example 19 was repeated except that the alkoxysilane used was changed to a mixture of 197.1 g (0.80 mols) of 2-[3,4-epoxycyclohexyl] ethyltrimethoxysilane and 48.9 g (0.20 mols) of diphenyldimethoxysilane, thereby obtaining 202.0 g of a light yellow transparent liquid at a yield of 97.1%. The liquid was found to have the following average composition formula and had a viscosity of 608.5 cps. (25° C.), a specific gravity of 1.153 (25° C.), a refractive index of 1.5022 (25° C.) and an epoxy equivalent of 275.1 (g/mol, theoretical: 273.0)

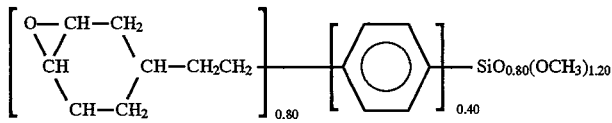

The above structure was supported by the results of the analyses of IR absorption spectra, $^1$H-NMR spectra and $^{29}$Si-NMR spectra.

EXAMPLE 23

The general procedure of Example 19 was repeated except that the alkoxysilane used was changed to a mixture of 82.8 g (0.30 mols) of 9,10-epoxydecyltrimethoxysilane and 152.7 g (0.70 mols) of 3,3,3-trifluoropropyltrimethoxysilane and that 12.6 g (0.70 mols) of water was used for the hydrolysis, thereby obtaining 198.5 g of a colorless transparent liquid at a yield of 97.7%. The liquid was found to have the following average composition formula and had a viscosity of 29.8 cps. (25° C.), a specific gravity of 1.162 (25° C.), a refractive index of 1.4152 (25° C.) and an epoxy equivalent of 661.3 (g/mol, theoretical: 677.3)

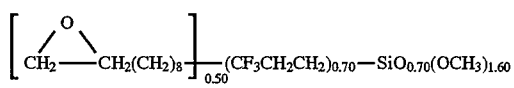

The above structure was supported by the results of the analyses of IR absorption spectra, $^1$H-NMR spectra and $^{29}$Si-NMR spectra.

EXAMPLE 24

The general procedure of Example 19 was repeated except that the alkoxysilane used was changed to a mixture of 177.2 g (0.75 mols) of γ-glycidoxypropyltrimethoxysilane, 11.0 g (0.05 mols) of γ-glycidoxypropyldimethoxysilane and 22.6 g (0.10 mols) of 1,3-dimethyltetramethoxydisiloxane and that 12.6 g (0.70 mols) of water was used to conduct the hydrolysis and condensation, followed by removal of the resultant methanol by distillation.

Thereafter, 300 g of toluene was added to the reaction solution, followed by washing with 200 g of a 10 wt % sodium sulfate aqueous solution three times to remove the KF catalyst. Moreover, the toluene was distilled off under reduced pressure to obtain 167.9 g of a colorless transparent liquid having the following average compositional formula at a yield of 94%.

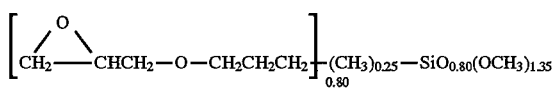

The liquid had a viscosity of 107.6 cps. (25° C.), a specific gravity of 1.170 (25° C.), a refractive index of 1.4562 (25° C.) and an epoxy equivalent of 223.5 (g/mol, theoretical: 223.4)

The above structure was supported by the results of the analyses of IR absorption spectra, $^1$H-NMR spectra and $^{29}$Si-NMR spectra.

EXAMPLE 25

The general procedure of Example 19 was repeated using 15.4 g (0.86 mols) of water and 5×10$^{-5}$ mols of KF were used, thereby obtaining a liquid having a viscosity of 49.9 centistokes (25° C.), a specific gravity of 1.126 (25° C.), an epoxy equivalent of 192.7 (g/mol, theoretical: 196.9) and an OH content of 0.70 wt %.

The liquid was subjected to analysis of $^1$H-NMR, from which the liquid was confirmed to have the following compositional formula

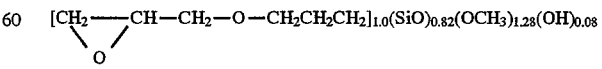

COMPARATIVE EXAMPLE 6 (Acidic Hydrolysis)

The general procedure of Example 24 was repeated except that 0.1N hydrochloric acid was used instead of water used for the hydrolysis without use of any KF to obtain 197.6 g of a liquid material at a yield of 110.6%. The thus obtained liquid had a viscosity of 11.3 cps. (25° C.), a specific gravity of 1.116 (25° C.), a refractive index of 1.4530 (25° C.) and an epoxy equivalent of 252.5 (g/mol).

When the hydrolysis reaction does not proceed at all, i.e. the degree of hydrolysis is zero, the epoxy equivalent was 261.5 g/mol, so that the above results show that the hydrolysis and condensation did not proceed at all.

COMPARATIVE EXAMPLE 7 (Acidic Hydrolysis)

The general procedure of Comparative Example 6 was repeated except that 1N hydrochloric acid was used instead of the 0.1N hydrochloric acid and that the reaction was effected under reflux of methanol, thereby obtaining 195 g of a liquid at a yield of 109.2%. The liquid had a viscosity of 13.9 cps. (25° C.), a specific gravity of 1.121 (25° C.), a refractive index of 1.4232 (25° C.) and an epoxy equivalent of 265.4 (g/mol).

It will be seen that since the concentration of hydrochloric acid is increased, the hydrolysis and condensation proceeds to an extent slightly greater than in the case of Comparative Example 6. It is apparent that breakage in part of the epoxy group took place.

EXAMPLE 26

Preparation of $[(HSC_3H_6)_{0.168}(CH_3)_{0.833}SiO_{0.833}(OCH_3)_{1.334}]_6$ 196.8 g (1.00 mol) of γ-mercpatopropyltrimethoxysilane, 679.7 g (5 mols) of methyltrimethoxysilane and 300 g of methanol were charged into a flask equipped with an agitator, a Liebig condenser, a dropping funnel and a thermometer, in which a mixed solution of 89.9 g of a 0.1N hydrochloric acid aqueous solution (containing 5.0 mols of water and $9\times10^{-3}$ mols of hydrochloric acid) and 90 g of methanol was dropped in 30 minutes under agitation, followed by aging at 25° C. for 2.5 hours. Thereafter, 3.49 g of a 1% potassium fluoride solution in methanol (KF: $6\times10^{-4}$ mols) was charged into the reaction solution, followed by keeping at 25° C. for 3 hours for hydrolysis and condensation. After charging 5.2 g (0.09 mols) of propylene oxide as a neutralizing agent, the resultant alcohol was distilled off under conditions of 100° C./30 mmHg, followed by filtration. As a result, there was obtained 585 g of a mercapto group and alkoxy group-containing silicone at a yield of 90.5%. The silicone had an insoluble matter content of 75.6%, a viscosity of 9.2 cps. (25° C.), a specific gravity of 1.130 (25° C.), a refractive index of 1.4146 (25° C.), a SH content of 5.2 wt % (theoretical: 5.1 wt %) and a S content of 5.5 wt %. The silicone was subjected to analysis of $^1$H-NMR, from which it had the following average compositional formula $(HSC_3H_6)_{0.2}(CH_3)_{0.8}SiO_{0.833}(OCH_3)_{1.229}$ The above formula was supported in view of the results of analyses of $^{29}$Si-NMR and IR absorption spectra. The results of GPC analysis revealed that the silicone had a weight-average molecular weight of 808 with a dispersion of 1.7. Because low molecular weight components were distilled off in small amounts, the compositional formula slightly differs from the theoretical and had substantially such a structure as designed. The results of $^{29}$Si-NMR spectra are shown in Table 4.

TABLE 4

| Chemical Shift δ (ppm) | Structure | Integral Ratio |
|---|---|---|
| −4.27 to −43.0 | RSi(OCH$_3$)$_3$ | 0.8 |
| −48.2 | RSi(OCH$_3$)$_2$O$_{1/2}$ | 24.2 |
| −50.0 to −51.6 | do. | 7.3 |
| −56.2 to −59.7 | RSiOCH$_3$O$_{2/2}$ | 52.7 |
| −64.0 to −67.1 | RSiO$_{3/2}$ | 15.0 |

R: —C$_3$H$_6$SH, —CH$_3$

The results of $^1$H-NMR spectra are shown in Table 5 below.

TABLE 5

(25% CHCl$_3$ solution)

| Chemical Shift δ(ppm) | Attribution | Integral Ratio |
|---|---|---|
| 0.2 | a | 11.8 |
| 0.6 | b | 2.0 |
| 1.2 | c | 0.9 |
| 1.6 | d | 2.0 |
| 2.4 | e | 2.0 |
| 3.5 | f | 17.1 |
| 7.3 | g | 12.0 |

The attributions, respectively, correspond to those indicated in the formulas below.

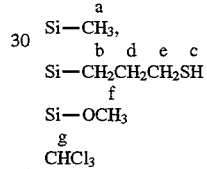

Figure 15:
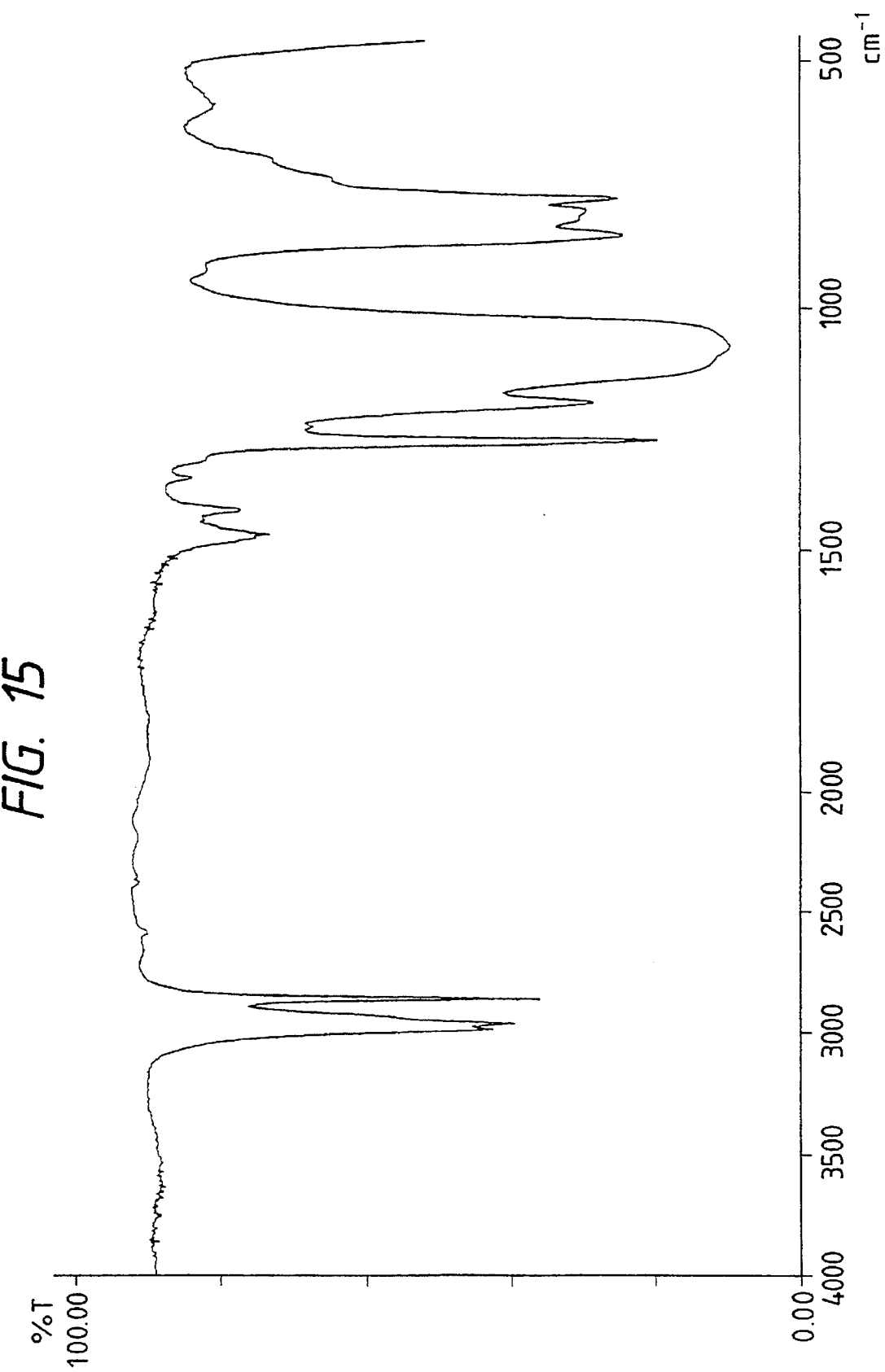
FIG. 15 is an IR absorption spectrum chart of an mercapto group and alkoxy group-containing organopolysiloxane oligomer obtained in Example 20.

The IR absorption spectrum chart of the silicone is shown in FIG. 15.

Absorption of Si—O—Si: 1104 cm$^{-1}$.
Absorptions of Si—OCH$_3$: 2481 cm$^{-1}$ and 1104 cm$^{-1}$.

EXAMPLE 27

Preparation of $[(HSC_3H_6)_{0.167}SiO_{0.833}(OCH_3)_{1.167}(OCH_2CH_3)_{2.000}]_6$ 262.4 g (1.34 mols) of γ-mercpatopropyltrimethoxysilane, 1386.1 g (6.67 mols) of tetraethoxysilane and 368 g of methanol were charged into a flask equipped with an agitator, a Liebig condenser, a dropping funnel and a thermometer, in which a mixed solution of 120.0 g of a 0.05N hydrochloric acid aqueous solution (containing 6.67 mols of water and $6\times10^{-3}$ mols of hydrochloric acid) and 92 g of methanol was dropped in 30 minutes under agitation, followed by aging at 25° C. for 2.5 hours. Thereafter, 23.3 g of a 1% potassium fluoride solution in methanol (KF: $4\times10^{-3}$ mols) was charged into the reaction solution, followed by keeping at 25° C. for 3 hours for hydrolysis and condensation. The resultant alcohol was distilled off under conditions of 100° C./30 mmHg, followed by filtration. As a result, there was obtained 1072 g of a mercapto group and alkoxy group-containing silicone at a yield of 89.9%. The silicone had an insoluble matter content of 62.7%, a viscosity of 7.5 cps. (25° C.), a specific gravity of 1.093 (25° C.), a refractive index of 1.4134 (25° C.), a SH content of 3.9 wt % (theoretical: 3.6 wt %) and a S content of 3.9 wt %. The silicone was subjected to analysis of $^1$H-NMR, revealing that it had the following average compositional formula $(HSC_3H_6)_{0.167}SiO_{0.833}(OCH_3)_{0.167}(OCH_2CH_3)_{2.000}$ The above formula was supported from the results of analyses of $^{29}$Si-NMR and IR absorption spectra.

The results of $^{29}$Si-NMR spectra are shown in Table 6.

TABLE 6

| Chemical Shift δ (ppm) | Structure | Integral Ratio |
|---|---|---|
| −46.1 | R'Si(OCH$_3$)$_3$ | 2.4 |
| −52.0 to −53.2 | R'Si(OCH$_3$)$_2$O$_{1/2}$ | 10.1 |
| −61.0 | R'SiOCH$_3$O$_{2/2}$ | 3.7 |
| −81.9 | (C$_2$H$_{5O}$)$_4$Si | 1.1 |
| −87.8 to −89.0 | (C$_2$H$_{5O}$)$_3$SiO$_{1/2}$ | 37.2 |
| −95.5 to −96.3 | (C$_2$H$_{5O}$)$_2$SiO$_{2/2}$ | 28.2 |
| −101.5 to −104.2 | C$_2$H$_{5O}$SiO$_{3/2}$ | 14.3 |
| −111.5 | SiO$_{4/2}$ | 3.0 |

R': —C$_3$H$_6$SH

The results of the $^1$H-NMR spectrum analysis are shown in Table 7.

TABLE 7

(25% CHCl$_3$ Solution)

| Chemical Shift δ(ppm) | Attribution | Integral Ratio |
|---|---|---|
| 0.9 | a | 2.0 |
| 1.2 | b | 38.6 |
| 1.9 | c | 2.0 |
| 2.5 | d | 2.0 |
| 33.5 | e | 3.4 |
| 3.8 | f | 25.0 |
| 7.3 | g | 22.4 |

The attributions, respectively, correspond to those indicated in the formulas below.

```
        a   c   d   b
Si—CH2CH2CH2SH,
        e
Si—OCH3
      f    b
Si—OCH2CH3
    g
CHCl3
```

Figure 16:
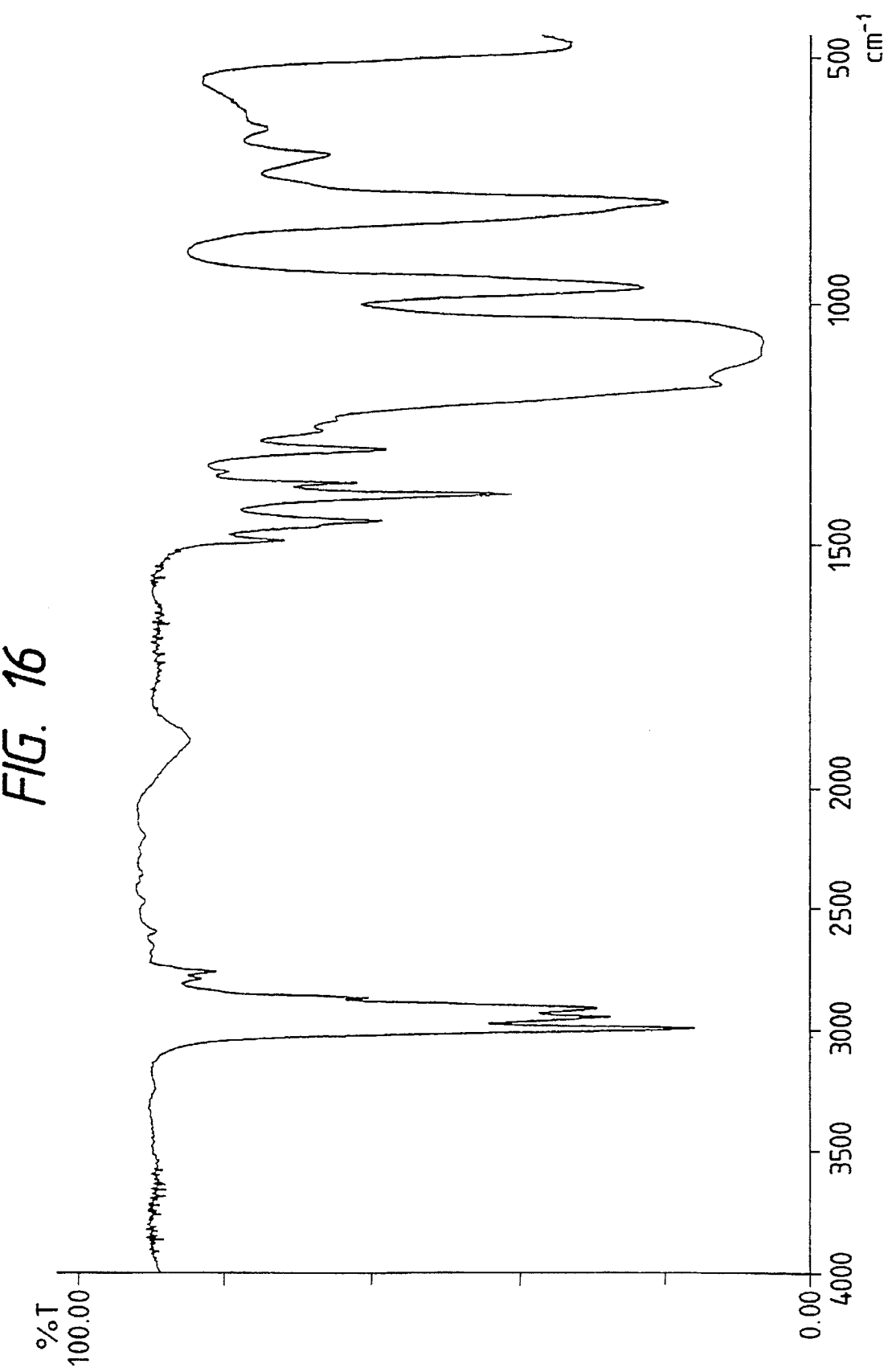
FIG. 16 is an IR absorption spectrum chart of an mercapto group and alkoxy group-containing organopolysiloxane oligomer obtained in Example 21.

The IR absorption spectrum chart of the silicone is shown in FIG. 16.

Absorption of Si—O—Si: 1104 cm$^{-1}$.

Absorptions of Si—OCH$_3$: 2481 cm$^{-1}$, 1198 cm$^{-1}$ and 1104 cm$^{-1}$.

EXAMPLE 28

Preparation of $[(HSC_3H_6)_{0.1}(C_6H_5)_{0.3}(CH_3)_{0.6}SiO_{0.9}(OCH_3)_{0.4}(OC_3H_7)_{0.8}]_{10}$ 196.4 g (1.0 mol) of γ-mercaptopropyltrimethoxysilane, 525 g (1.5 mols) of a disiloxane of the following average compositional formula

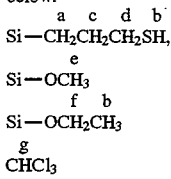

and 994.2 g (3.0 mols) of a disiloxane of the following average compositional formula

Figure 17:
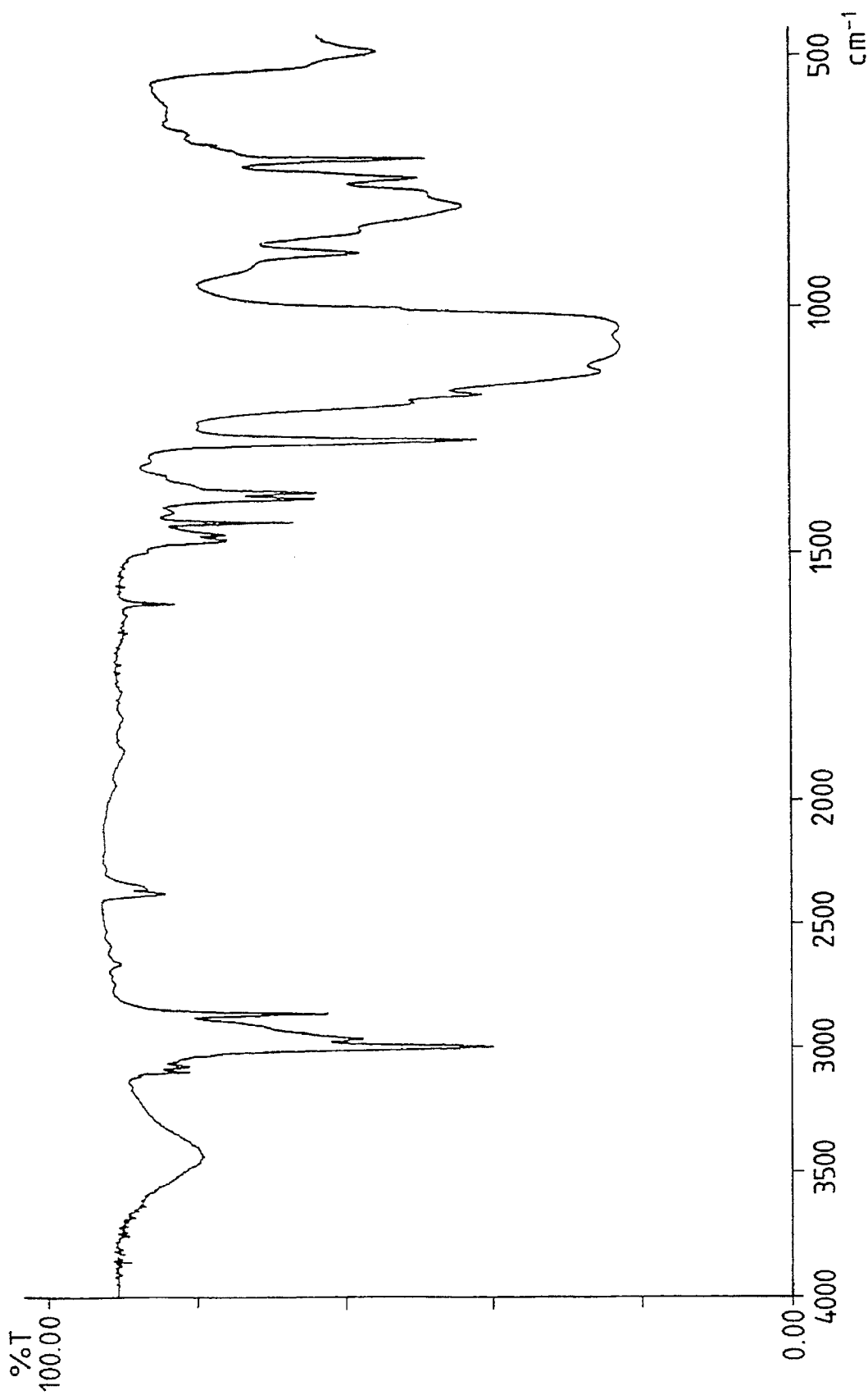
FIG. 17 is an IR absorption spectrum chart of an mercapto group and alkoxy group-containing organopolysiloxane oligomer obtained in Example 22.

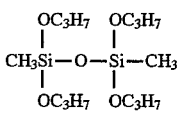

were charged into a flask equipped with an agitator, a Liebig condenser, a dropping funnel and a thermometer, in which a mixed solution of 77.2 g of a 0.05N hydrochloric acid aqueous solution (containing 4.29 mols of water and 4×10$^{-3}$ mols of hydrochloric acid) and 77.2 g of methanol was dropped in 30 minutes under agitation, followed by aging at 25° C. for 2.5 hours. Thereafter, 2.9 g of a 1% potassium fluoride solution in methanol (KF: 5×10$^{-4}$ mols) was charged into the reaction solution, followed by keeping at 25° C. for 3 hours for hydrolysis and condensation. The resultant alcohol was distilled off under conditions of 100° C./10 mmHg, followed by filtration. As a result, there was obtained 1120 g of a mercapto group and alkoxy group-containing silicone at a yield of 79.1%. The silicone had an insoluble matter content of 69.5%, a viscosity of 14.5 cps. (25° C.), a specific gravity of 1.089 (25° C.), a refractive index of 1.4530 (25° C.), a SH content of 2.5 wt % (theoretical: 2.3 wt %) and a S content of 2.2 wt %. The silicone was subjected to analysis of $^1$H-NMR, revealing that it was identified as having the following average compositional formula $(HSC_3H_6)_{0.1}(C_6H_5)_{0.3}(CH_3)_{0.6}SiO_{0.9}(OCH_3)_{0.4}(OC_3H_7)_{0.85}(OH)_{0.15}$ The above formula was supported by the results of analyses of $^{29}$Si-NMR and IR absorption spectra. The IR spectrum chart is shown in FIG. 17.

EXAMPLE 29

Preparation of $[(HSC_3H_6)_{0.167}(CH_3)_{0.833}SiO_{0.967}(OCH_3)_{1.067}]_{30}$ The general procedure of Example 25 was repeated using 104.4 g of a 0.1N hydrochloric acid aqueous solution (water: 5.98 mols and HCl: 10.4×10$^{-3}$ mols), thereby obtaining 505.7 g of a silicone resin having a degree of polymerization of 30 at a yield of 83.0%. The resin had an insoluble matter content of 85.2%, a viscosity of 215 centistokes (25° C.), a specific gravity of 1.141 (25° C.), a SH content of 5.5 wt % (theoretical: 5.4 wt %) and an S content of 5.4 wt %.

EXAMPLE 30

The general procedure of Example 25 was repeated except that water was used instead of the 0.1N hydrochloric acid aqueous solution, thereby obtaining 520.2 of a silicone resin at a yield of 80.5%. The resin had an insoluble matter content of 76.2%, a viscosity of 12.1 centistokes (25° C.), a specific gravity of 1.132 (25° C.), a SH content of 5.4 wt % (theoretical: 5.4 wt %) and an S content of 5.6 wt %.

What is claimed is:

1. A process for preparing an organic functional group-containing organopolysiloxane of the following average compositional formula $$Y_mR^1{}_nSi(OR^2)_pO_{(4-m-n-p)/2} \qquad (1)$$

where Y represents an organic member having a functionality selected from the group consisting of a substituted or unsubstituted alkenyl group, an epoxy group, a (meth)

acryloxy group, an amino group, a hydroxy group, a siloxy group, an ether group, a ketone group, an ester group and a phosphorus containing organic group. $R^1$ represents at least one monovalent substituted or unsubstituted hydrocarbon group having from 1 to 8 carbon atoms. $R^2$ represents at least one member selected from the group consisting of an alkyl group having from 1 to 4 carbon atoms and an alkenyl group having from 2 to 5 carbon atoms, wherein $0 \leq m \leq 1$, $0 \leq n \leq 2$, and $0 \leq p \leq 2$ provided that $0 < m+n+p \leq 3$, the process comprising providing an organic functional group-containing alkoxy silane of the following formula (2)

$$Y—SiR^1_a(OR^2)_{3-a} \qquad (2)$$

wherein Y, $R^1$ and $R^2$ have, respectively, the same meanings as defined above, and a is an integer within $0 \leq a \leq 2$, and subjecting the organic functional group-containing alkoxysilane to hydrolysis and polycondensation in the presence of an Si—F bond-containing silicon compound, using water in a molar amount less than one half times that of the alkoxy groups in said organic functional group-containing alkoxysilane or in a molar amount of from one half to fifty times the molar amount of alkoxy groups in said organic functional group-containing alkoxysilane.

2. The process according to claim 1, wherein the Si—F bond-containing silicon compound is present in an amount such that a molar ratio between the Si atoms in said organic functional group-containing alkoxysilane and the F atoms in said fluorine-containing compound is within the range 1:0.00001 to 1:2.

3. The process according to claim 1, wherein said organic group represented by Y consists of an organic group having an epoxy group represented by the formula

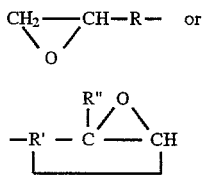

wherein R represents a divalent hydrocarbon group having from 1 to 8 carbon atoms or said group with an oxygen atom therein, R' represents a trivalent hydrocarbon group having from 6 to 10 carbon atoms, and R" represents a hydrogen atom, an alkyl group having from 1 to 4 carbon atoms or an alkenyl group having from 2 to 5 carbon atoms.

4. The process according to claim 1, wherein when water is used in an amount of from one half to fifty times, the hydrolysis and polycondensation further comprises a monoalkoxysilane which is present in a molar ratio of said monoalkoxysilane to the organic functional group-containing alkoxysilane of 0.01:3 to 1:3.

5. The process according to claim 1, further comprising at least one compound selected from the group consisting of alkoxysilane compounds of the following formula (3), siloxane compounds of the following formula (4) and partially and fully hydrolyzed condensates of at least one of the alkoxysilane compounds of formula (3) and the siloxane compounds of formula (4)

$$(R^1)_b Si(OR^2)_{4-b} \qquad (3)$$

$$R^1_c SiO_{(4-c-d)/2}(OR^2)_d \qquad (4)$$

wherein $R^1$ and $R^2$ have, respectively, the same meanings as defined above, b is 0 or an integer of 1, 2 or 3, c is a value within the range of $0 \leq c \leq 2$, and d is a value within a range of $0 \leq d \leq 3$ provided that $0.01 \leq c+d \leq 3$.

6. The process according to claim 5, wherein said at least one compound consists of the alkoxysilane compound of formula (3).

7. The process according to claim 5, wherein said at least one compound consists of the siloxane compound of formula (4).

8. The process according to claim 5, wherein said at least one compound is used in an amount of up to 99.9 wt/% of the total of said organic functional group-containing alkoxysilane and said at least one compound.

9. The process according to claim 5, wherein said at least one compound comprises a monoalkoxysilane and is present in an amount such that the molar ratio of said monoalkoxysilane to the total of said organic functional group-containing alkoxysilane and said at least one compound is in the range of 0.01:3 to 1:3.

10. The process according to claim 5, wherein said mixture comprises at least 70 wt/% of tri, tetra and/or higher polyalkoxy functional group-containing compounds and the amount of water is in the range of 1 to 50 times by mole of the total alkoxy groups in the mixture, whereby said organopolysiloxane is obtained in the form of a solid.

11. The process of claim 1, wherein water is used in a molar amount less than one half times that of the alkoxy groups in said organic functional group-containing alkoxysilane.

12. The process according to claim 1, wherein water is used in a molar amount of from one half to fifty times the molar amount of the alkoxy groups in said organic functional group-containing alkoxysilane.

* * * * *